US010411815B2

(12) United States Patent
Nakamura et al.

(10) Patent No.: US 10,411,815 B2
(45) Date of Patent: Sep. 10, 2019

(54) LIGHTING SYSTEM AND QUALITY DETERMINATION METHOD FOR LIGHTING SYSTEM

(71) Applicant: Panasonic Intellectual Property Management Co., Ltd., Osaka (JP)

(72) Inventors: Shigeo Nakamura, Osaka (JP); Kentaro Yamauchi, Hyogo (JP); Tomokazu Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/010,820

(22) Filed: Jun. 18, 2018

(65) Prior Publication Data

US 2018/0375595 A1    Dec. 27, 2018

(30) Foreign Application Priority Data

Jun. 22, 2017   (JP) .................................. 2017-122556

(51) Int. Cl.
| | |
|---|---|
| H04B 17/00 | (2015.01) |
| H04B 17/17 | (2015.01) |
| H05B 37/02 | (2006.01) |
| H04B 17/318 | (2015.01) |
| H04W 52/24 | (2009.01) |

(52) U.S. Cl.
CPC ......... *H04B 17/17* (2015.01); *H04B 17/0085* (2013.01); *H04B 17/318* (2015.01); *H04W 52/245* (2013.01); *H05B 37/0272* (2013.01)

(58) Field of Classification Search
CPC .. H04B 17/17; H04B 17/0085; H04B 17/101; H04B 17/318; H04W 4/80; H04W 52/245
See application file for complete search history.

(56) References Cited

U.S. PATENT DOCUMENTS

| | | | | |
|---|---|---|---|---|
| 6,828,733 | B1 * | 12/2004 | Crenshaw | H02J 9/02 315/150 |
| 9,999,117 | B2 * | 6/2018 | Newton | H05B 37/0272 |
| 2016/0127875 | A1 * | 5/2016 | Zampini, II | H04W 4/043 370/311 |

FOREIGN PATENT DOCUMENTS

| | | |
|---|---|---|
| JP | 2009-076956 A | 4/2009 |
| JP | 2009-295394 A | 12/2009 |

(Continued)

*Primary Examiner* — Tuan Pham
(74) *Attorney, Agent, or Firm* — McDermott Will & Emery LLP

(57) ABSTRACT

A lighting system includes: a wireless communication device that transmits a test signal; luminaires that measure a signal strength of the test signal upon receipt and transmit signal strength information on the signal strength to the wireless communication device; and a determining unit that determines a condition of the lighting system based on the signal strength or the signal strength information. The determining unit: determines the condition of the lighting system to be acceptable upon confirming transmission of the signal strength information by all luminaires and unacceptable upon failing to confirm transmission of the signal strength information by at least one luminaire; or determines the condition of the lighting system to be acceptable when each signal strength measured by all luminaires exceeds a reference value and unacceptable when the signal strength measured by at least one luminaire is less than or equal to the reference value.

17 Claims, 18 Drawing Sheets

(56) References Cited

FOREIGN PATENT DOCUMENTS

| | | |
|---|---|---|
| JP | 2016-091637 A | 5/2016 |
| JP | 2016-178014 A | 10/2016 |
| WO | 2016/067713 A1 | 5/2016 |

* cited by examiner

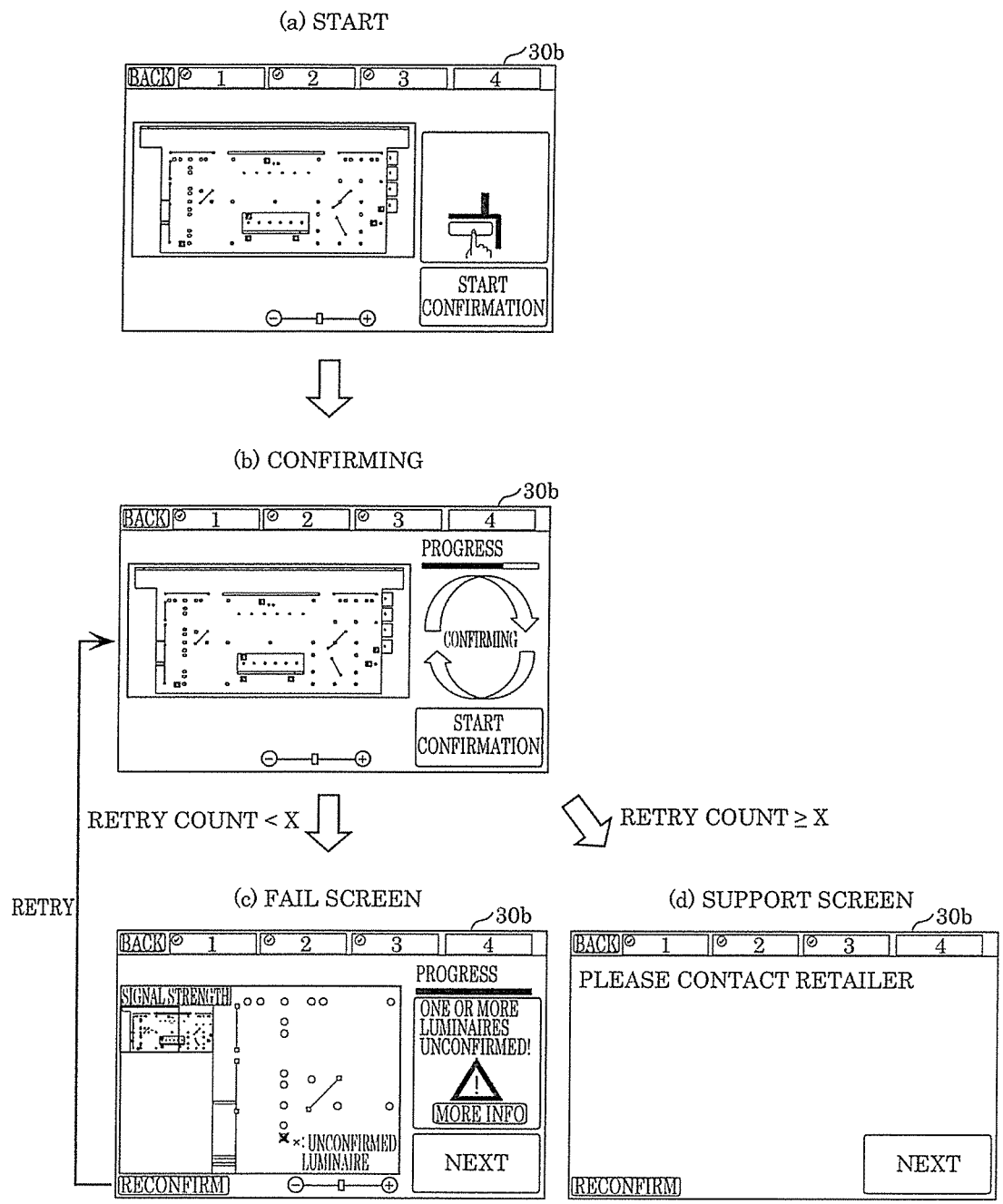

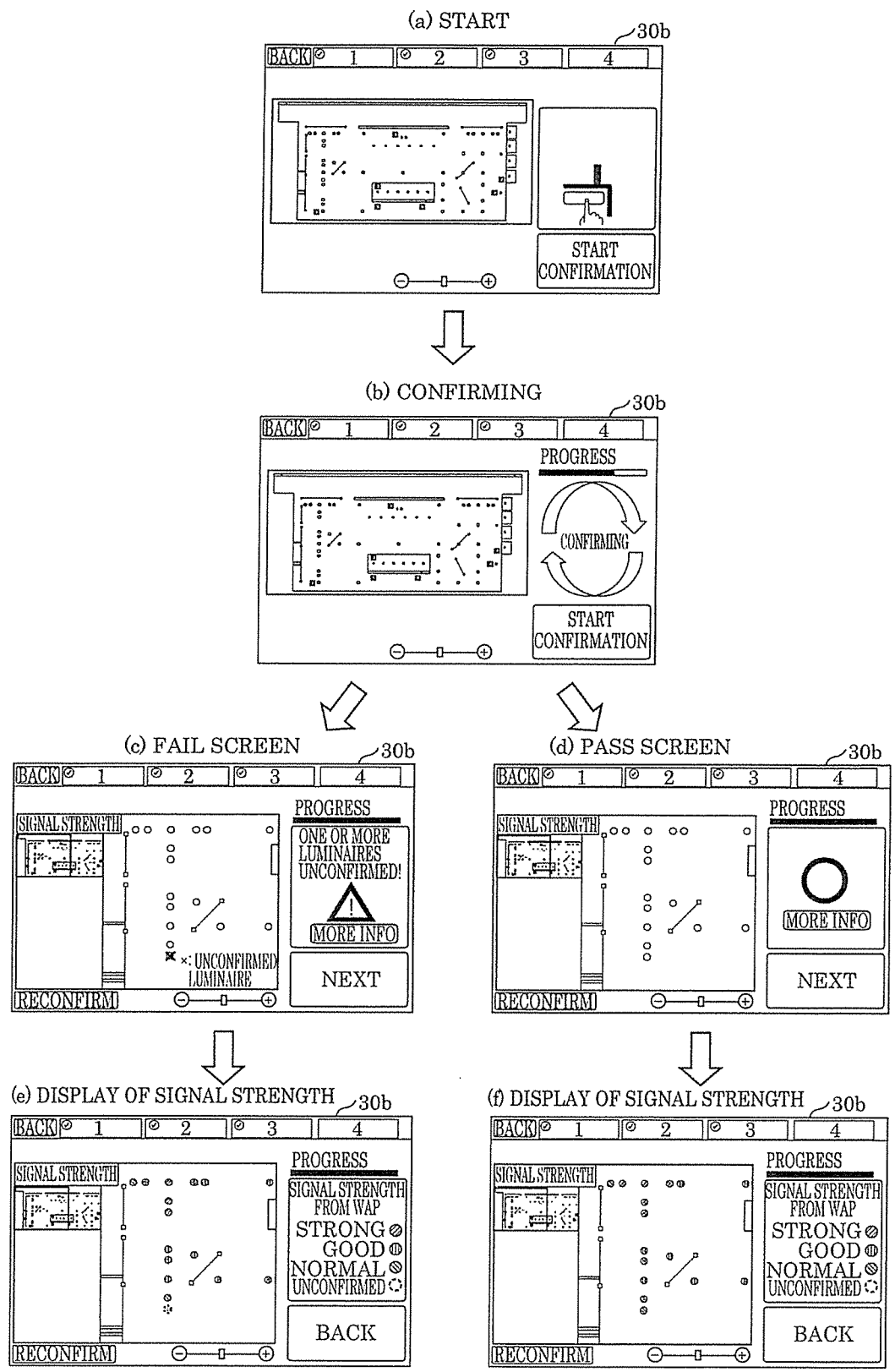

LIGHTING SYSTEM AND QUALITY DETERMINATION METHOD FOR LIGHTING SYSTEM

CROSS REFERENCE TO RELATED APPLICATION

This application claims the benefit of priority of Japanese Patent Application Number 2017-122556 filed on Jun. 22, 2017, the entire content of which is hereby incorporated by reference.

BACKGROUND

1. Technical Field

The present disclosure relates to a lighting system including a luminaire and a wireless communication device, and to a quality determination method for such a lighting system.

2. Description of the Related Art

Conventionally, a lighting system including a plurality of luminaires and a wireless communication device that communicates with the plurality of luminaires is known (for example, see Japanese Unexamined Patent Application Publication No. 2016-178014). With this type of lighting system, pairing is performed between the wireless communication device and each of the luminaires after the wireless communication device and the plurality of luminaires have been installed on, for example, a structure of a building.

SUMMARY

However, for example, when there are many luminaires and the pairing process takes a number of days to complete, there are cases when the radio wave environment of the wireless communication device and plurality of luminaires changes before the pairing process is complete due to, for example, new equipment being installed in the building. Accordingly, there are cases in which the luminaires do not operate as intended by the user when the settings in the lighting system are the same as before the change in the radio wave environment.

In view of this, the present disclosure has an object to provide, for example, a lighting system that can improve reliability in relation to the radio wave environment.

A lighting system according to one aspect of the present disclosure includes: a wireless communication device that transmits a test signal which is an instruction to measure signal strength; a plurality of luminaires, each of which, upon receiving the test signal, measures a signal strength of the test signal and transmits signal strength information on the signal strength to the wireless communication device; and a determining unit configured to determine a condition of the lighting system based on one of the signal strength and the signal strength information. The determining unit is configured to: (i) determine the condition of the lighting system to be acceptable upon confirming transmission of the signal strength information by all of the plurality of luminaires, and determine the condition of the lighting system to be unacceptable upon failing to confirm transmission of the signal strength information by at least one of the plurality of luminaires; or (ii) determine the condition of the lighting system to be acceptable when each of the signal strengths measured by all of the plurality of luminaires exceeds a reference value, and determine the condition of the lighting system to be unacceptable when the signal strength measured by at least one of the plurality of luminaires is less than or equal to the reference value.

A quality determination method according to one aspect of the present disclosure is a method for a lighting system including a plurality of luminaires and a wireless communication device that communicates with the plurality of luminaires, and includes: transmitting a test signal from the wireless communication device to the plurality of luminaires, the test signal being an instruction to measure signal strength; measuring, by each of the plurality of luminaires, a signal strength of the test signal upon receiving the test signal, and transmitting, by each of the plurality of luminaires, signal strength information on the signal strength to the wireless communication device; and (i) determining the condition of the lighting system to be acceptable upon confirming transmission of the signal strength information by all of the plurality of luminaires, and determining the condition of the lighting system to be unacceptable upon failing to confirm transmission of the signal strength information by at least one of the plurality of luminaires, or (ii) determining the condition of the lighting system to be acceptable when each of the signal strengths measured by all of the plurality of luminaires exceeds a reference value, and determining the condition of the lighting system to be unacceptable when the signal strength measured by at least one of the plurality of luminaires is less than or equal to the reference value.

A lighting system, etc., according to the present disclosure can improve reliability in relation to the radio wave environment.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 7 illustrates a display input unit included in a terminal device in a lighting system according to Embodiment 6;

FIG. 8 illustrates a display input unit included in a terminal device in a lighting system according to Embodiment 7;

DETAILED DESCRIPTION OF THE EMBODIMENTS

Embodiment 1

(1-1. Lighting System Outline)

Figure 1:
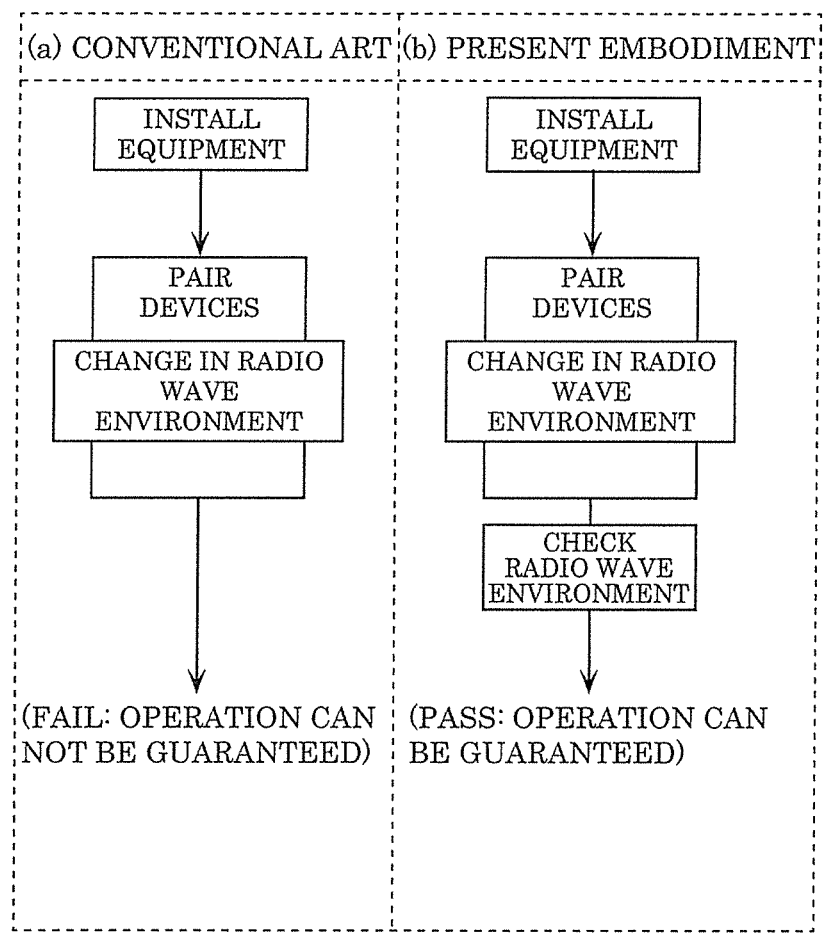
FIG. 1 is a schematic diagram comparing a conventional lighting system and a lighting system according to Embodiment 1.

First, an outline of the lighting system according to this embodiment will be given. FIG. 1 is a schematic diagram comparing a conventional lighting system and the lighting system according to Embodiment 1.

These lighting systems include a plurality of luminaires and a wireless communication device that communicates with the plurality of luminaires. With these lighting systems, pairing is performed between the wireless communication device and each of the luminaires after the wireless communication device and plurality of luminaires have been installed on, for example, a structure of a building. Pairing makes it possible to specify communication partners among the wireless communication device and luminaires. With the conventional lighting system, more often than not, the lighting system is handed over to the user after pairing is complete, in a state in which the initial settings are still in place, as illustrated in (a) in FIG. 1.

However, when the pairing process takes a number of days to complete, there are cases when the radio wave environment of the wireless communication device and plurality of luminaires changes as a result of, for example, new equipment being installed in the building. Accordingly, there are cases in which the luminaires do not operate as intended by the user when the settings in the lighting system are the same as before the change in the radio wave environment.

In view of this, in this embodiment, before the lighting system is handed over to the user, the radio wave environment of the lighting system is checked and the lighting system is placed in a state in which operation can be guaranteed, as illustrated in (b) in FIG. 1. Note that a state in which operation can be guaranteed refers to a state in which the lighting system can be handed over to the user in good conscience.

The following describes exemplary embodiments of the lighting system, etc., according to the present disclosure with reference to the drawings. Each of the embodiments described below is merely one specific example of the present disclosure. The numerical values, shapes, materials, elements, arrangement and connection of the elements, etc., indicated in the following embodiments are given merely by way of illustration and are not intended to limit the present disclosure. Therefore, among elements in the following embodiments, those not recited in any one of the independent claims defining the broadest concept of the present disclosure are described as optional elements.

Note that the figures are schematic illustrations and are not necessarily precise depictions. Moreover, in the figures, elements that are essentially the same share like reference signs. Accordingly, duplicate description is omitted or simplified.

(1-2. Lighting System Configuration)

Figure 2A:
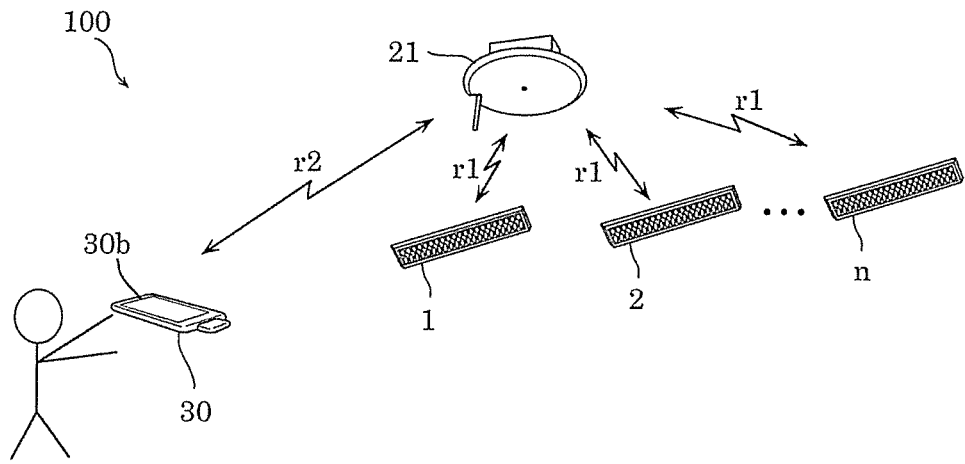
FIG. 2A is a diagram of a lighting system according to Embodiment 1.
Figure 2B:
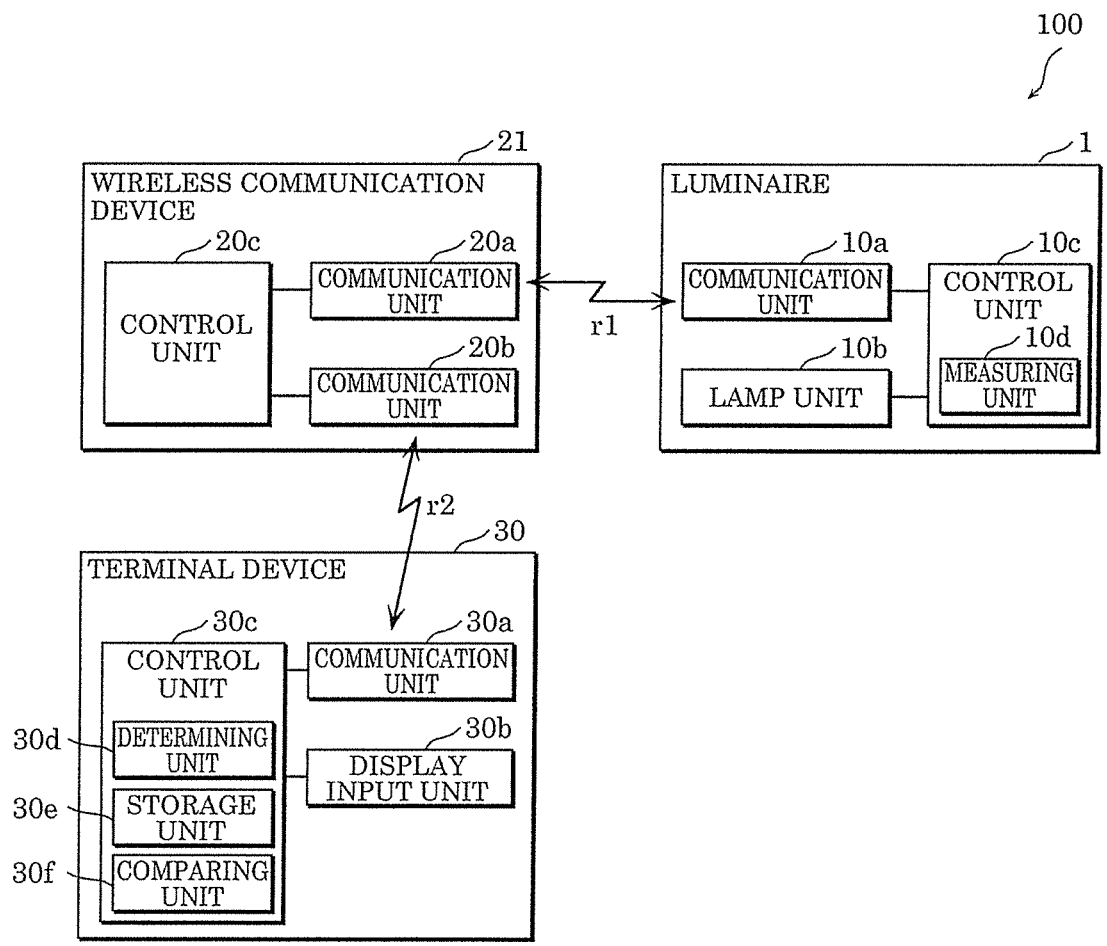
FIG. 2B is a block diagram illustrating the configuration of a lighting system according to Embodiment 1.

FIG. 2A is a diagram of lighting system 100 according to Embodiment 1. FIG. 2B is a block diagram illustrating the configuration of lighting system 100.

Lighting system 100 includes a plurality of luminaires 1 and 2 through n (n is an integer greater than or equal to 2), wireless communication device 21, and terminal device 30. Luminaires 1 through n are each capable of communicating with wireless communication device 21 over radio r1. Examples of communication schemes used over radio r1 include specified low power radio that uses a frequency in the 920 MHz or 2.4 GHz band, Zigbee®, Bluetooth®, and WiFi®. Terminal device 30 is capable of communicating with wireless communication device 21 over radio r2 via, for example, WiFi®.

Luminaires 1 through n are, for example, LED lights. Conceivably, over 100 luminaires 1 through n may be installed on a structure (e.g., ceiling) of a building. Hereinafter, the description will be based around luminaire 1, which is presented as a representative luminaire from among luminaires 1 through n.

Luminaire 1 includes: communication unit 10a that communicates with wireless communication device 21 external to luminaire 1; lamp unit 10b; and control unit 10c connected to communication unit 10a and lamp unit 10b.

Communication unit 10a includes, for example, an antenna and a wireless module. As previously described, communication unit 10a communicates with wireless communication device 21 over radio r1.

Lamp unit 10b includes a plurality of light sources, such as light-emitting diodes that emit, for example white, red, green, and/or blue light.

Control unit 10c includes, for example, a central processing unit (CPU), random access memory (RAM), and read-only memory (ROM). An identifier that identifies luminaire 1, such as a media access control (MAC) address, is stored in control unit 10c. For example, control unit 10c controls the operating state of lamp unit 10b based on an instruction from terminal device 30.

Control unit 10c also includes measuring unit 10d that measures signal strength. More specifically, based on the test signal, which is an instruction transmitted from wireless communication device 21 to measure signal strength, measuring unit 10d measures the signal strength of the test signal itself. Signal strength information on the measured signal strength is transmitted to wireless communication device 21 via communication unit 10a.

Wireless communication device 21 is, for example, a wireless controller or wireless adapter. Wireless communication device 21 includes: communication unit 20a that communicates with luminaire 1; communication unit 20b that communicates with terminal device 30; and control unit 20c connected to communication unit 20a and communication unit 20b.

Communication unit 20a and communication unit 20b each include, for example, an antenna and a wireless module. As previously described, communication unit 20b communicates with terminal device 30 over radio r2.

For example, control unit 20c includes a CPU, RAM, and ROM. An identifier that identifies wireless communication device 21, such as a MAC address, is stored in control unit 20c. Control unit 20c receives, via communication unit 20b, a measurement start signal originating from terminal device 30. A measurement start signal is an instruction to start measurement of signal strength in lighting system 100. Upon receiving this measurement start signal, control unit 20c transmits the test signal to luminaires 1 through n via communication unit 20a.

Moreover, control unit 20c aggregates the signal strength information measured and transmitted by luminaires 1 through n, and transmits the aggregate information to terminal device 30 via communication unit 20b.

Via wireless communication device 21, terminal device 30 sets settings or performs control relating to causing luminaires 1 through n to emit light. When wireless communication device 21 functions as a slave, terminal device 30 is equivalent to a master controller. Terminal device 30 illustrated in FIG. 2A is exemplified as a hand-held terminal, but may be a stationary computer terminal.

Terminal device 30 includes: communication unit 30a; display input unit 30b; and control unit 30c connected to communication unit 30a and display input unit 30b. Control unit 30c includes determining unit 30d, storage unit 30e, and comparing unit 30f.

Communication unit 30a includes, for example, an antenna and a wireless module. As previously described, communication unit 30a communicates with wireless communication device 21 over radio r2. Note that communication unit 30a and wireless communication device 21 may be configured to communicate over a wired connection.

For example, display input unit 30b is a touch panel and displays the reception quality of luminaires 1 through n, and also receives inputs for wireless communication device 21 and luminaires 1 through n.

Control unit 30c includes a CPU. Control unit 30c transmits a command inputted by operating a key or keys on display input unit 30b to wireless communication device 21 via communication unit 30a. For example, storage unit 30e includes RAM and ROM. A layout map for luminaires 1 through n and wireless communication device 21 in the building is stored in storage unit 30e. Additionally, the above-described signal strength information is also stored in storage unit 30e. Comparing unit 30f outputs a comparison result to display input unit 30b based on signal strength information stored in storage unit 30e. Determining unit 30d determines whether the condition of the radio wave environment in lighting system 100 is acceptable or not based on the plurality of items of signal strength information transmitted from wireless communication device 21.

In this embodiment, determining unit 30d determines the condition of lighting system 100 to be acceptable upon confirming transmission of signal strength information from all luminaires 1 through n, via wireless communication device 21. Moreover, determining unit 30d determines the condition of lighting system 100 to be unacceptable upon failing to confirm transmission of signal strength information by at least one of luminaires 1 through n. In this way, with lighting system 100 according to this embodiment, it is possible to check the radio wave environment of lighting system 100 and thus improve the reliability of lighting system 100.

(1-3. Lighting System Quality Determination Method)

Figure 2C:
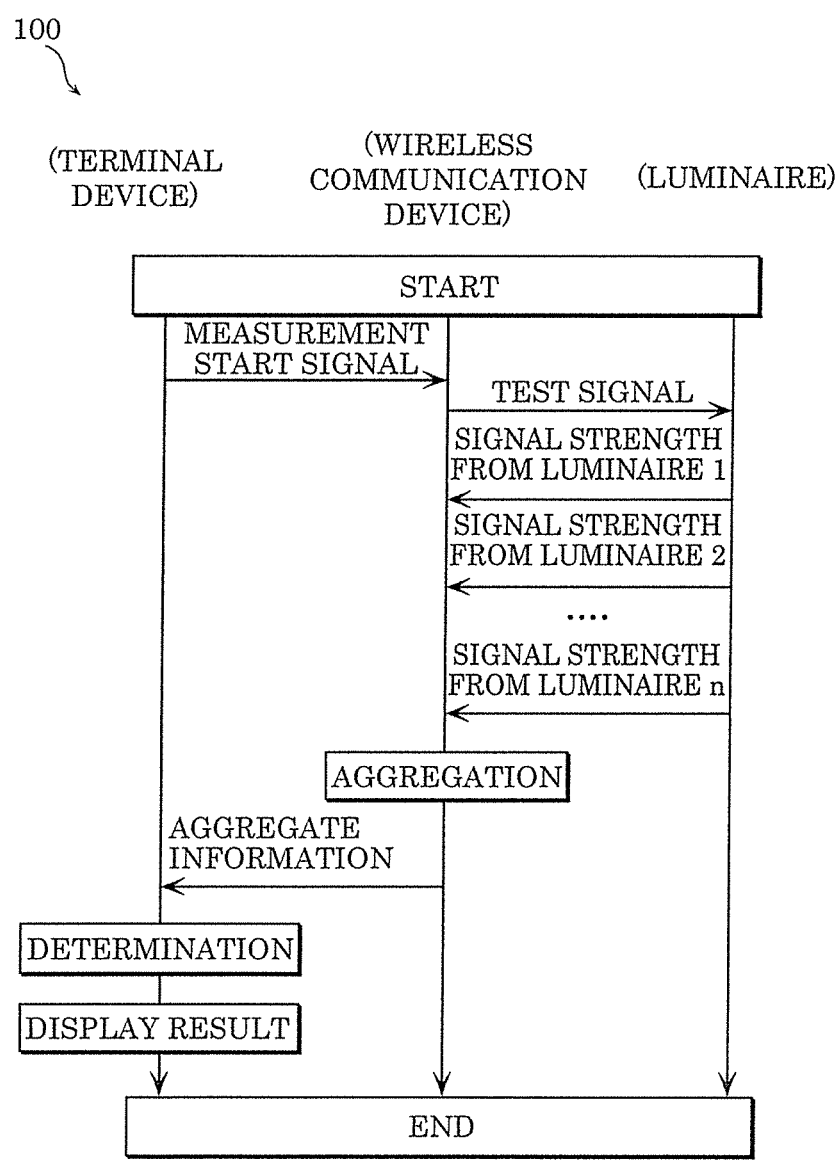
FIG. 2C is a flow chart of the quality determination for a lighting system according to Embodiment 1.
Figure 2D:
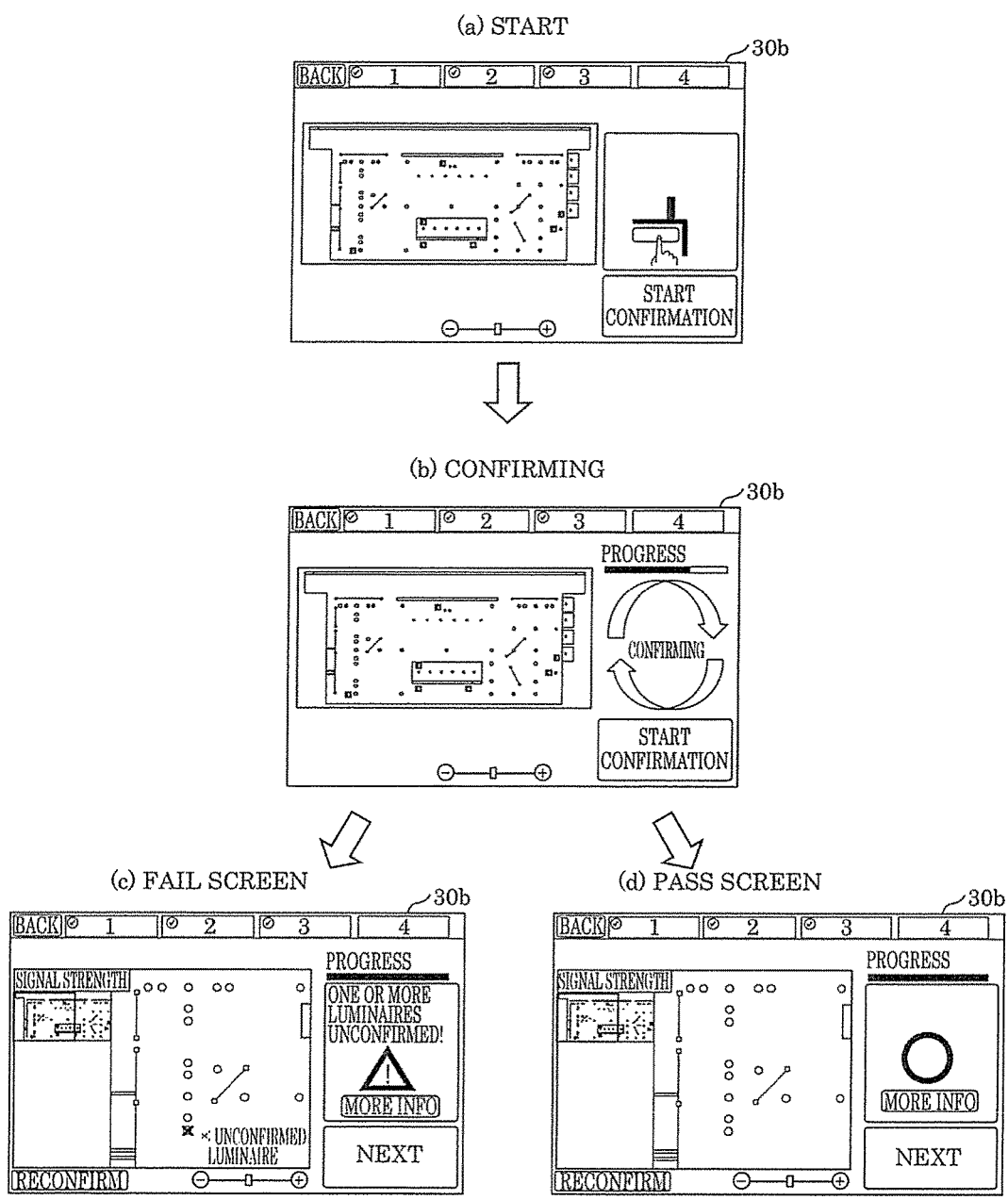
FIG. 2D illustrates a display input unit included in a terminal device in a lighting system according to Embodiment 1.

Next, the quality determination method for lighting system 100 will be described. FIG. 2C is a flow chart illustrating the quality determination for lighting system 100. FIG. 2D illustrates display input unit 30b included in terminal device 30 in lighting system 100.

First, the previously described measurement start signal is transmitted from terminal device 30 to wireless communication device 21. More specifically, the measurement start signal is transmitted upon the "start confirmation" icon displayed on display input unit 30b in (a) in FIG. 2D being pressed. This causes display input unit 30b to display the screen illustrated in (b) in FIG. 2D indicating that quality determination is being performed ("confirming" in (b) FIG. 2D).

As illustrated in FIG. 2C, upon receipt of the measurement start signal, wireless communication device 21 transmits a test signal to luminaires 1 through n, which constitute the group of luminaires that are controlled. This signal may be transmitted to each luminaire 1 through n individually via unicast or transmitted to each luminaire 1 through n at once via multicast.

Having received the test signal, each luminaire 1 through n automatically measures the signal strength of the received test signal. Each luminaire 1 through n then transmits signal strength information on the signal strength to wireless communication device 21. The signal strength information includes the measured signal strength (i.e., includes a received signal strength indicator (RSSI)). The signal strength information may include information on the date and time that the signal strength was measured, and may include an identifier that identifies the corresponding luminaire.

Next, wireless communication device 21 automatically aggregates the transmitted signal strength information, and transmits the aggregate signal strength information to terminal device 30. In addition to the signal strength, the signal strength information transmitted from wireless communication device 21 may include information on the date and time that the signal strength was aggregated, and may include an identifier that identifies wireless communication device 21. Note that the signal strength information may be, but is not limited to being, transmitted to terminal device 30 after being aggregated by control unit 20c as described above; each item of signal strength information may be aggregated by terminal device 30 after being individually transmitted to terminal device 30.

Next, terminal device 30 automatically determines whether the condition of the radio wave environment is acceptable or not based on the transmitted signal strength information. In this embodiment, determining unit 30d in terminal device 30 determines the condition of lighting system 100 to be acceptable upon confirming transmission of the signal strength information by all luminaires 1 through n, and determines the condition of lighting system 100 to be unacceptable upon failing to confirm transmission of the signal strength information by at least one of luminaires 1 through n. The determination result is then displayed on display input unit 30b. For example, when the determination result is "fail" (indicating that the condition of lighting system 100 is unacceptable), a "fail" screen such as the one illustrated in (c) in FIG. 2D is displayed, and when the determination result is "pass" (indicating that the condition of lighting system 100 is acceptable), a "pass" screen such as the one illustrated in (d) in FIG. 2D is displayed.

Figure 2E:
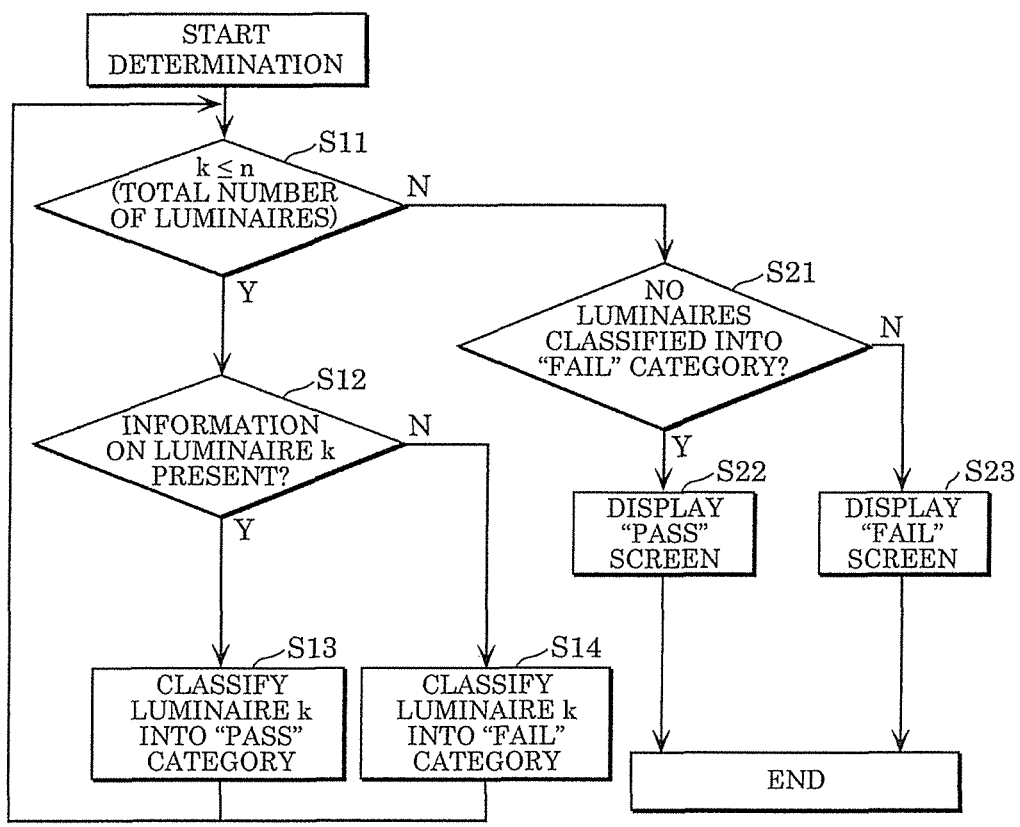
FIG. 2E is a flow chart of the process for confirming whether signal strength information has been transmitted or not in a lighting system according to Embodiment 1.

More specifically, the quality determination is performed based on the flow chart illustrated in FIG. 2E. FIG. 2E is a flow chart of the process for confirming whether signal strength information has been transmitted or not in lighting system 100 according to Embodiment 1.

Terminal device 30 illustrated in FIG. 2E sequentially confirms, from the first luminaire, luminaire 1, to the n-th luminaire, luminaire n, the following (Y in S11). For example, when control unit 30c possesses information on luminaire 1 (Y in S12), that is to say, when control unit 30c confirms that luminaire 1 has transmitted signal strength information, luminaire 1 is classified into the "pass" (acceptable condition) category (S13). However, when control unit 30c does not possess information on luminaire 1 (N in S12), that is to say, when control unit 30c fails to confirm that luminaire 1 has transmitted signal strength information, luminaire 1 is classified into the "fail" (unacceptable condition) category (S14). When this classification is complete, the process returns to step S11 and the same processes are repeated for luminaires 2 through n. When confirmation for all luminaires 1 through n is complete (N in S11), the process continues to the next step, where it is confirmed whether or not any of the luminaires were classified into the "fail" category (S21). Here, if no luminaires have been classified into the "fail" category (Y in S21), the condition of lighting system 100 is determined to be acceptable, and the "pass" screen is displayed on display input unit 30b (S22). If a luminaire has been classified into the "fail" category (N in S21), the condition of lighting system 100 is determined to be unacceptable, and the "fail" screen is displayed on display input unit 30b (S23).

Examples of conceivable situations that lead to the "fail" screen include when an obstruction is placed between wireless communication device 21 and a luminaire after the two have been paired and when a luminaire malfunctions after being paired, but so long as the above-described quality determination is performed, it is possible to implement a measure for placing lighting system 100 in acceptable condition. In other words, it is possible to improve reliability in relation to the radio wave environment of lighting system 100 by performing the quality determination according to this embodiment before handing lighting system 100 over to the user.

Moreover, in this embodiment, after the measurement start signal is transmitted from terminal device 30, the determination result can be obtained automatically without having to perform any special operations on, for example, terminal device 30. Since the determination result can be obtained with a "one touch" operation, the work efficiency of the person who performs operations for determining the quality of lighting system 100 can be improved.

Embodiment 2

Next, lighting system 100 according to Embodiment 2 will be described. With lighting system 100 according to Embodiment 2, the quality determination for lighting system 100 is performed based on the magnitude of the signal strength.

Figure 3:
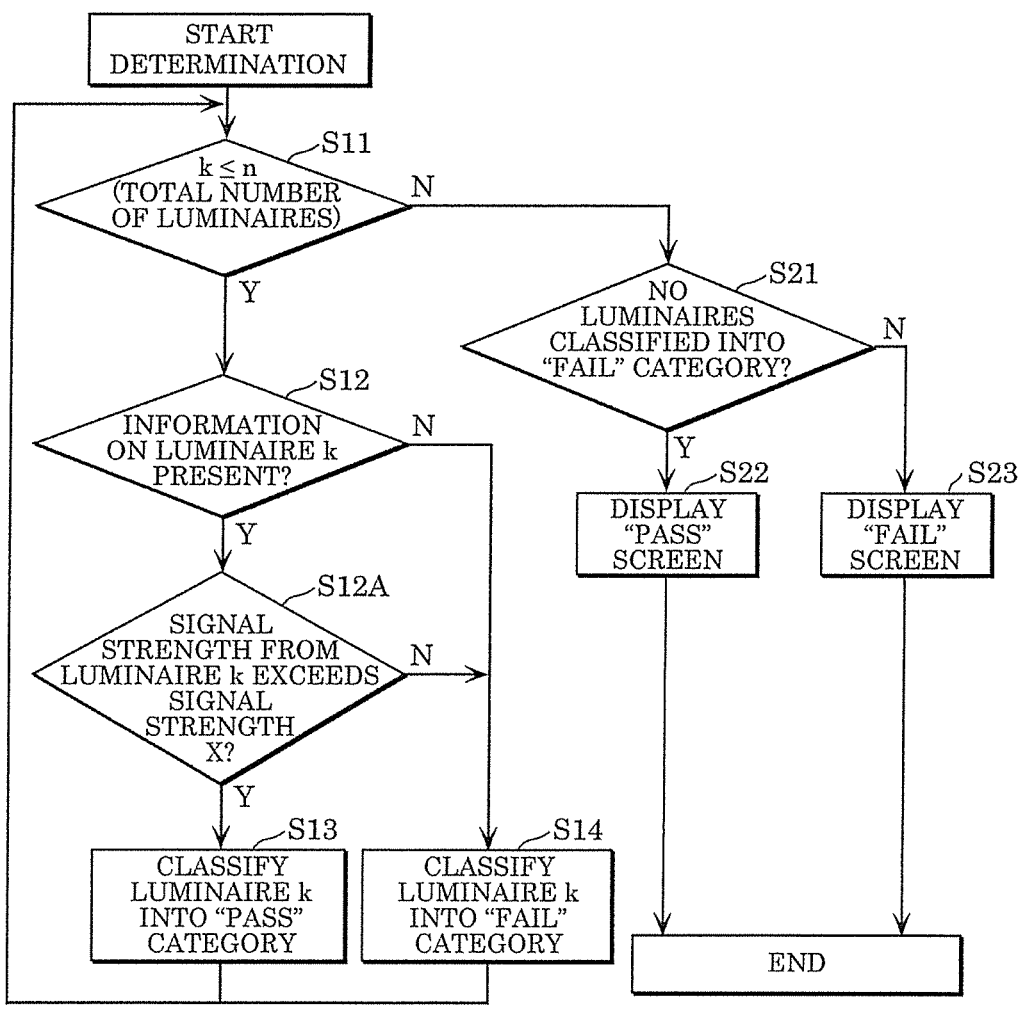
FIG. 3 is a flow chart of the process for checking the signal strength in a lighting system according to Embodiment 2.

FIG. 3 is a flow chart of the process for checking the signal strength in lighting system 100 according to Embodiment 2.

As illustrated FIG. 3, in the same step S12 as in Embodiment 1, after terminal device 30 confirms that the signal strength information has been transmitted (Y in S12), the magnitude of the signal strength included in the signal strength information is checked (S12A). More specifically, when the signal strength transmitted by luminaire 1 is greater than a predetermined reference value (signal strength X) (Y in 512A), luminaire 1 is classified into the "pass" category (S13). When the signal strength is less than or equal to the reference value (N in S12A), luminaire 1 is classified into the "fail" category (S14). When this classification is complete, the process returns to step S11 and the same processes are repeated for luminaires 2 through n. Then, if no luminaires have been classified into the "fail" category (Y in S21), determining unit 30d determines the condition of lighting system 100 to be acceptable, and if a luminaire has been classified into the "fail" category (N in S21), determining unit 30d determines the condition of lighting system 100 to be unacceptable.

In this way, with lighting system 100 according to Embodiment 2, it is possible to accurately know whether the condition of lighting system 100 is acceptable or not by checking the magnitude of the signal strengths from wireless communication device 21 and luminaires 1 through n. This makes it possible to improve reliability in relation to the radio wave environment of lighting system 100.

Embodiment 3

Next, lighting system 100 according to Embodiment 3 will be described. In Embodiment 3, the aggregation of the signal strength information in Embodiment 1 is performed a plurality of times. This embodiment is implemented, for example, when lighting system 100 is used in an unstable radio wave environment.

Figure 4A:
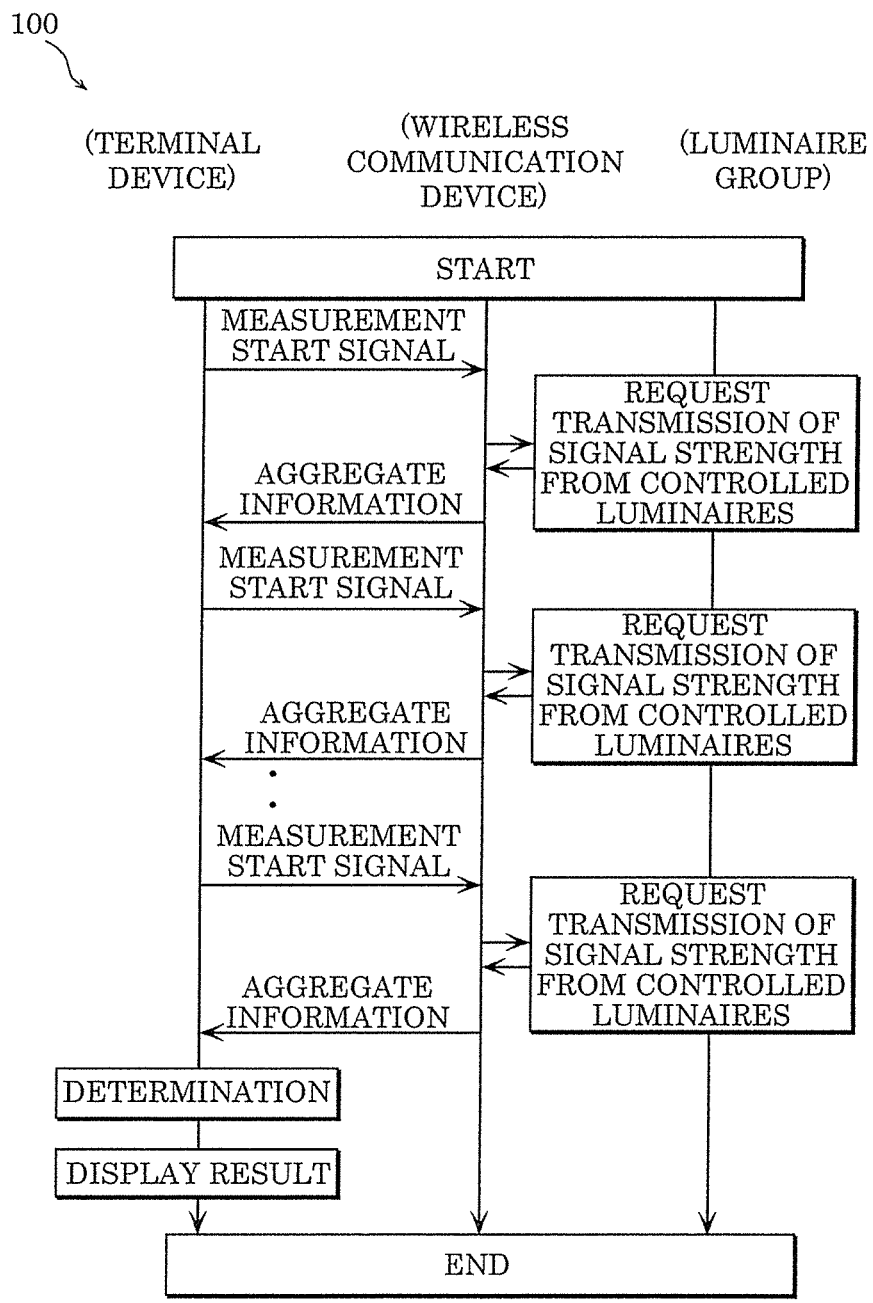
FIG. 4A is a flow chart of the quality determination for a lighting system according to Embodiment 3.

FIG. 4A is a flow chart of the quality determination for lighting system 100 according to Embodiment 3.

First, a first measurement start signal is transmitted from terminal device 30 to wireless communication device 21. Upon receipt of this measurement start signal, wireless communication device 21 requests transmission of signal strengths from luminaires 1 through n, which constitute the group of luminaires that are controlled. Having received the transmission request, each luminaire 1 through n then transmits first signal strength information to wireless communication device 21. Wireless communication device 21 then aggregates the first signal strength information and transmits the aggregate first signal strength information to terminal device 30.

Having received the first signal strength information, terminal device 30 automatically transmits a second measurement start signal to wireless communication device 21. Upon receipt of this measurement start signal, wireless communication device 21 requests transmission of signal strengths from the same luminaires 1 through n that transmitted the first signal strength information. Having received the transmission request, each luminaire 1 through n then transmits second signal strength information to wireless communication device 21. Wireless communication device 21 then aggregates the second signal strength information and transmits the aggregate second signal strength information to terminal device 30.

Similarly, in terminal device 30, wireless communication device 21, and luminaires 1 through n, the above-described measurement start signal transmission, signal strength transmission request, and signal strength information transmission and aggregation are performed automatically. Determining unit 30d checks the aggregate signal strength information and determines the condition of lighting system 100 to be acceptable if the number of times the signal strength information has been transmitted is greater than or equal to a reference number of times (X times), and determines the condition of lighting system 100 to be unacceptable if less than the reference number of times.

Figure 4B:
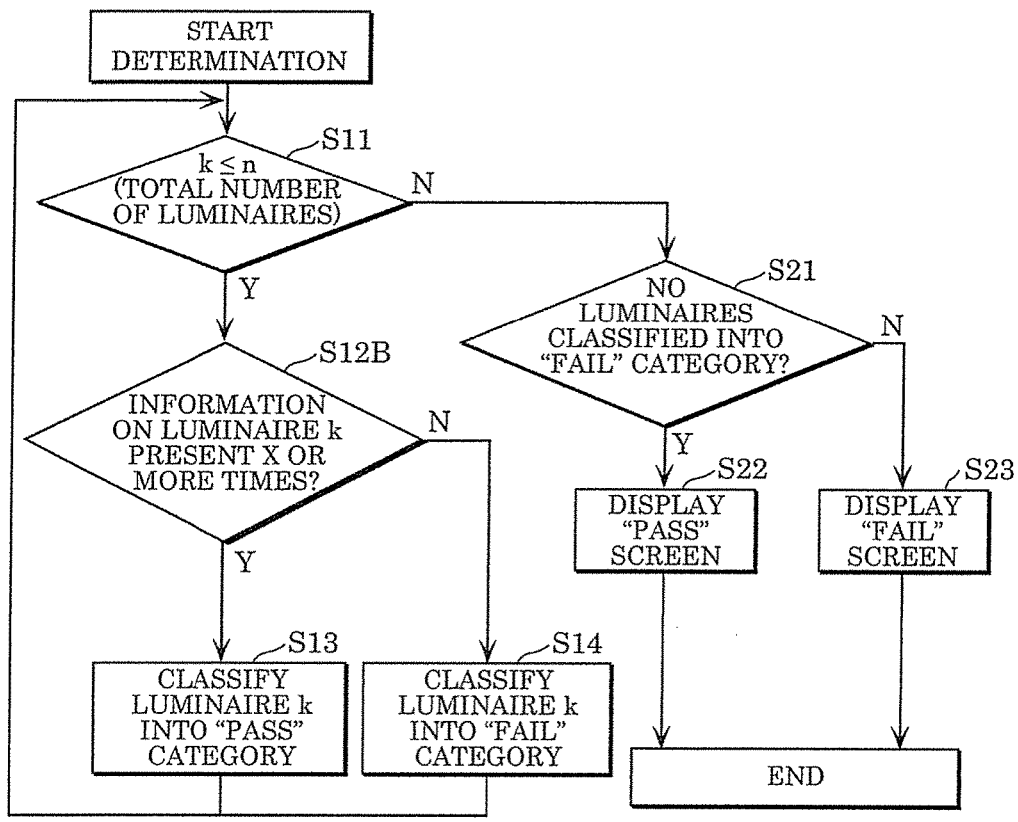
FIG. 4B is a flow chart of the process for checking the number of times that signal strength information has been transmitted in a lighting system according to Embodiment 3.

FIG. 4B is a flow chart of the process for checking the number of times that the signal strength information has been transmitted in lighting system 100 according to Embodiment 3.

As illustrated in FIG. 4B, terminal device 30 sequentially confirms, from the first luminaire, luminaire 1, to the n-th luminaire, luminaire n, the following (Y in S11). For example, if information relating to luminaire 1 has been present X or more times in control unit 30c (Y in S12B), that is to say, when it is confirmed that the number of times the information has been transmitted from luminaire 1 is greater than or equal to the reference number of times luminaire 1 is classified into the "pass" category (S13). However, if information relating to luminaire 1 has not been present X or more times in control unit 30c (N in S12B), that is to say, when it is not confirmed that the number of times the information has been transmitted from luminaire 1 is greater than or equal to the reference number of times, luminaire 1 is classified into the "fail" category (S14). When this classification is complete, the process returns to step S11 and the same processes are repeated for luminaires 2 through n. Then, just like in Embodiment 1, if no luminaires have been classified into the "fail" category (Y in S21), determining unit 30d determines the condition of lighting system 100 to be acceptable, and if a luminaire has been classified into the "fail" category (N in S21), determining unit 30d determines the condition of lighting system 100 to be unacceptable.

In this way, with lighting system 100 according to Embodiment 3, it is possible to increase the degree of certainty of the information obtained by checking the number of times that the signal strength information has been transmitted. This makes it possible to improve reliability of lighting system 100 even when lighting system 100 is placed in an unstable radio wave environment.

Embodiment 4

(4-1. Lighting System Configuration)

Figure 5A:
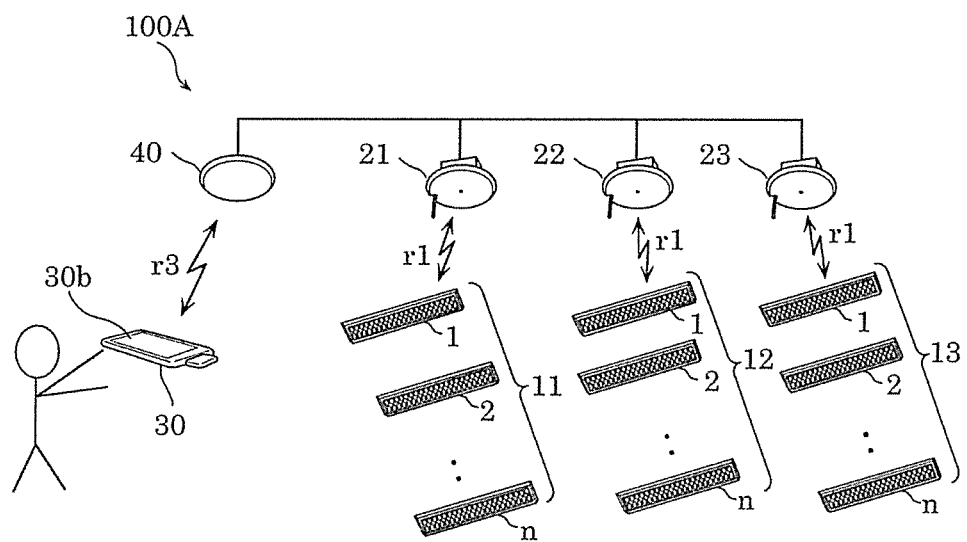
FIG. 5A is a diagram of a lighting system according to Embodiment 4.
Figure 5B:
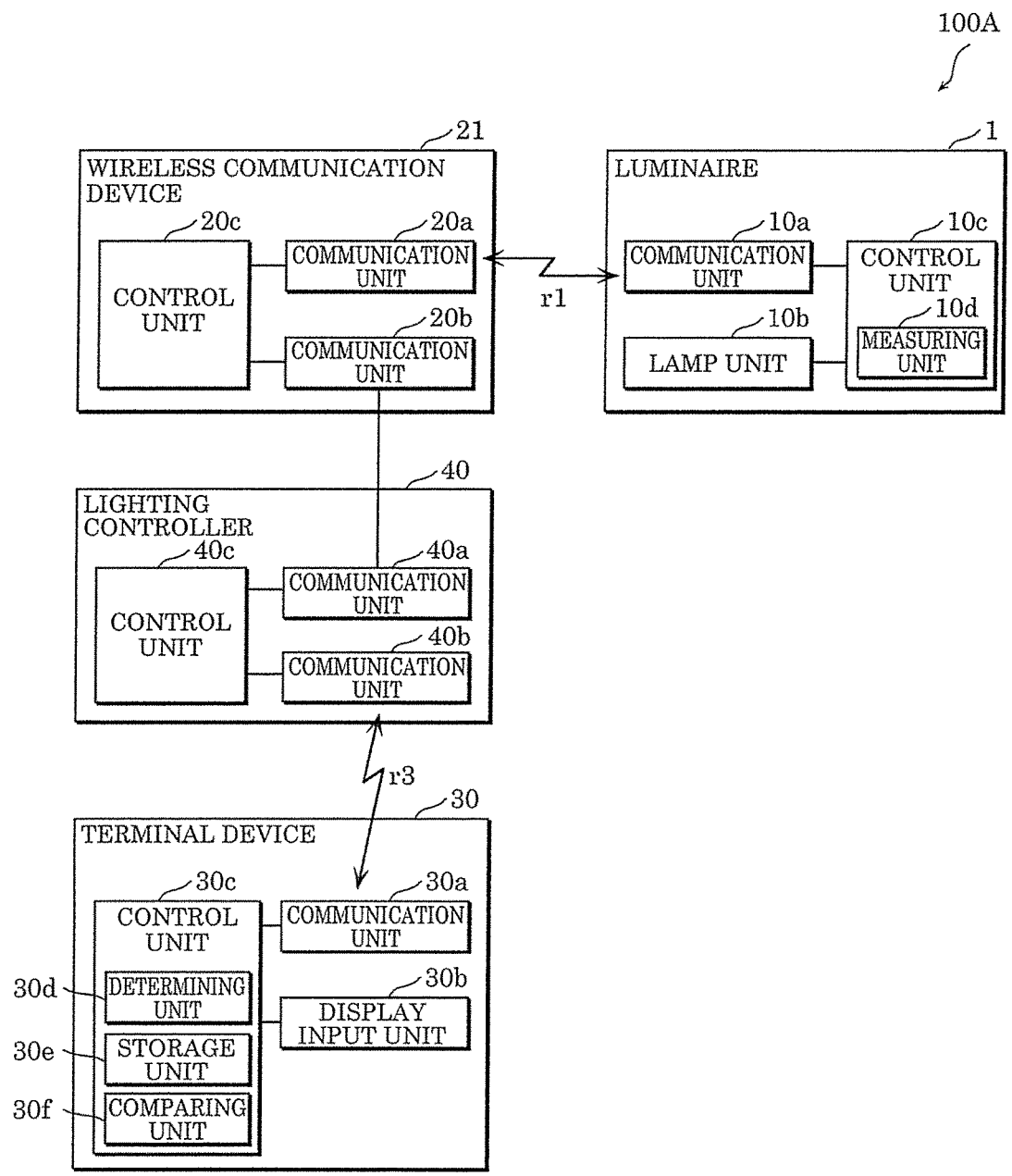
FIG. 5B is a block diagram illustrating the configuration of a lighting system according to Embodiment 4.

Next, lighting system 100A according to Embodiment 4 will be described. FIG. 5A is a diagram of lighting system 100A. FIG. 5B is a block diagram illustrating the configuration of lighting system 100A.

Lighting system 100A according to Embodiment 4 includes: luminaire groups 11, 12, and 13 each including luminaires 1 through n; wireless communication devices 21, 22, and 23; lighting controller 40; and terminal device 30. Luminaires 1 through n in luminaire group 11 are capable of communicating with wireless communication device 21 over radio r1, luminaires 1 through n in luminaire group 12 are capable of communicating with wireless communication device 22 over radio r1, and luminaires 1 through n in luminaire group 13 are capable of communicating with wireless communication device 23 over radio r1. Wireless communication devices 21, 22, and 23 are connected to lighting controller 40 via a wired connection. Terminal device 30 is capable of communicating with lighting controller 40 over radio r3.

Wireless communication devices 21 through 23 each include: communication unit 20a that communicates with luminaires 1 through n; communication unit 20b that communicates with lighting controller 40; and control unit 20c connected to communication unit 20a and communication unit 20b. Control unit 20c receives, from terminal device 30, a measurement start signal originating from lighting controller 40. Upon receiving this measurement start signal, control unit 20c transmits a test signal to luminaires 1 through n under its control via communication unit 20a. Moreover, control unit 20c aggregates the signal strength information transmitted from luminaires 1 through n under its control, and transmits the aggregate information to lighting controller 40 via communication unit 20b.

Lighting controller 40 is a master controller that controls wireless communication devices 21 through 23. Lighting controller 40 includes: communication unit 40a; communication unit 40b; and control unit 40c connected to communication unit 40a and communication unit 40b. Upon receiving a measurement start signal from terminal device 30, control unit 40c transmits a measurement start signal to wireless communication devices 21 through 23 via communication unit 40a. Moreover, control unit 40c transmits, to terminal device 30 via communication unit 40b, aggregate information on the signal strength information transmitted from wireless communication devices 21 through 23.

Terminal device 30 includes: communication unit 30a; display input unit 30b; and control unit 30c connected to communication unit 30a and display input unit 30b. Control unit 30c includes determining unit 30d, storage unit 30e, and comparing unit 30f. Control unit 30c transmits a command inputted by operating a key or keys on display input unit 30b to lighting controller 40 via communication unit 30a. Determining unit 30d determines whether the condition of the radio wave environment in lighting system 100 is acceptable or not based on the plurality of items of signal strength information transmitted from lighting controller 40.

In this embodiment, determining unit 30d in terminal device 30 determines the condition of lighting system 100A to be acceptable when each of the signal strengths measured by all luminaires 1 through n in luminaire groups 11 through 13 exceeds a reference value. Moreover, determining unit 30d determines the condition of lighting system 100A to be unacceptable when the signal strength measured by at least one of luminaires 1 through n in luminaire groups 11 through 13 is less than or equal to the reference value.

(4-2. Lighting System Quality Determination Method)

Figure 5C:
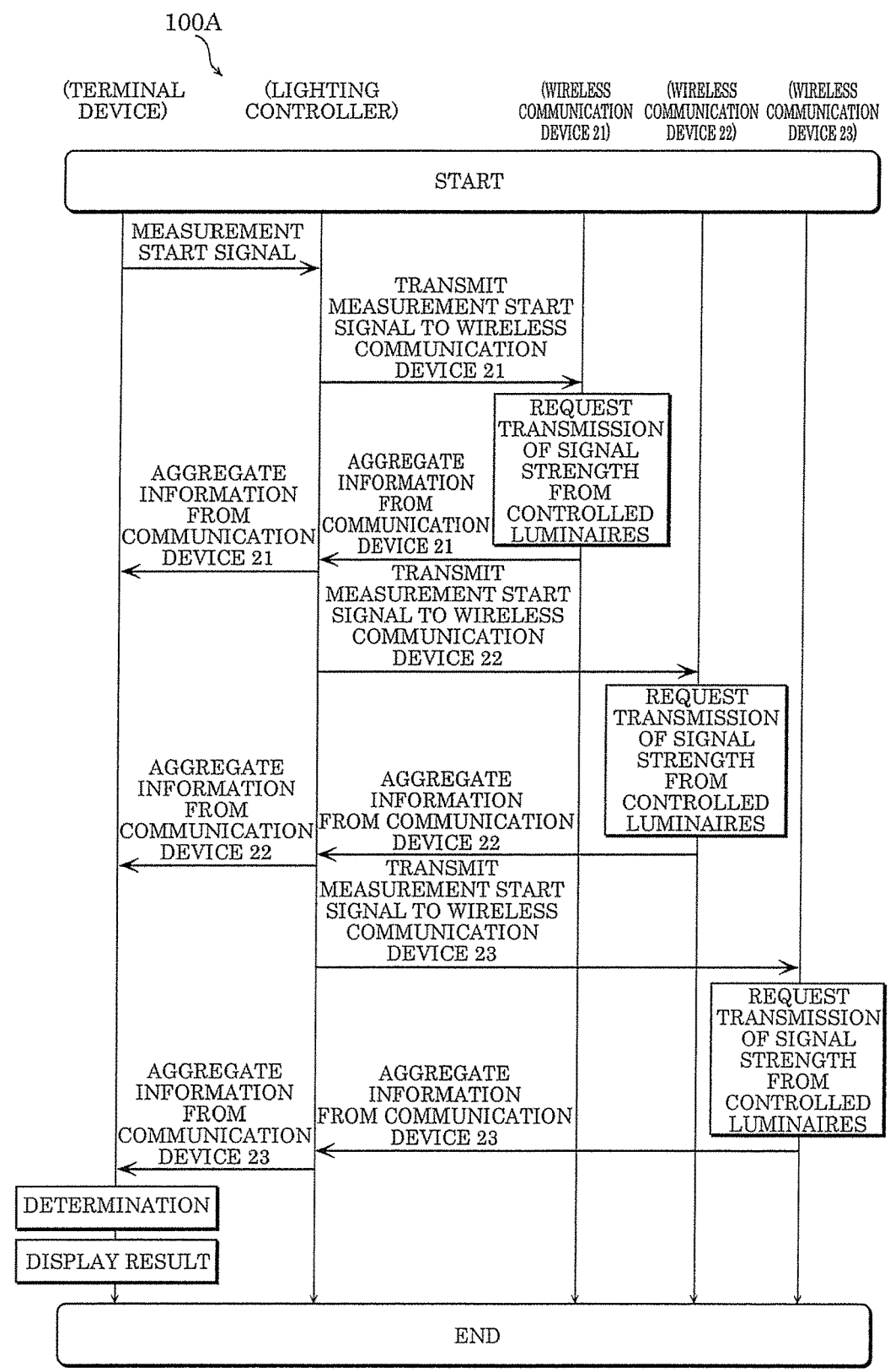
FIG. 5C is a flow chart of the quality determination for a lighting system according to Embodiment 4.

Next, the quality determination method for lighting system 100A will be described. FIG. 5C is a flow chart illustrating the quality determination for lighting system 100A.

First, a first measurement start signal is transmitted from terminal device 30 to lighting controller 40. Upon receiving this measurement start signal, lighting controller 40 transmits a measurement start signal to wireless communication device 21. Wireless communication device 21 requests transmission of signal strengths from luminaires 1 through n in luminaire group 11 under its control. Having received the transmission request, each of these luminaires 1 through n then transmits signal strength information to wireless communication device 21. Wireless communication device 21 then aggregates the signal strength information and transmits the aggregate information to lighting controller 40. Furthermore, lighting controller 40 then transmits the signal strength information aggregated by wireless communication device 21 to terminal device 30.

Next, having received the signal strength information from wireless communication device 21, lighting controller 40 automatically transmits a measurement start signal to wireless communication device 22. Upon receipt of this measurement start signal, wireless communication device 22 requests transmission of signal strengths from luminaires 1 through n in luminaire group 12 under its control. Having received the transmission request, each of these luminaires 1 through n then transmits signal strength information to wireless communication device 22. Wireless communication device 22 then aggregates the signal strength information and transmits the aggregate information to lighting controller 40. Furthermore, lighting controller 40 then transmits the signal strength information aggregated by wireless communication device 22 to terminal device 30.

Similarly, in terminal device 30, lighting controller 40, wireless communication devices 21 through 23, and luminaire groups 11 through 13, the above-described measurement start signal transmission, signal strength transmission request, and signal strength information transmission and aggregation are performed. Determining unit 30*d* checks the aggregate signal strength information and determines the condition of lighting system 100A to be acceptable if each of the signal strengths measured by all luminaires 1 through n in luminaire groups 11 through 13 exceeds a reference value. Moreover, determining unit 30*d* determines the condition of lighting system 100A to be unacceptable if the signal strength measured by at least one of luminaires 1 through n in luminaire groups 11 through 13 is less than or equal to the reference value.

In this way, with lighting system 100A according to Embodiment 4, even when there are a plurality of wireless communication devices 21 through 23, it is possible to accurately know whether the condition of lighting system 100A is acceptable or not by checking the magnitude of the signal strength in lighting system 100A. This makes it possible to improve reliability in relation to the radio wave environment of lighting system 100A.

Moreover, in this embodiment, even when a plurality of wireless communication devices 21 through 23 are included, after the measurement start signal is transmitted from terminal device 30, the determination result can be obtained automatically without having to perform any special operations on, for example, terminal device 30. Since the determination result can be obtained with a "one touch" operation, the work efficiency of the person who performs operations for determining the quality of lighting system 100A can be improved.

Embodiment 5

Next, lighting system 100 according to Embodiment 5 will be described. In Embodiment 5, the measurement of the signal strength described in Embodiment 2 is retried (repeated).

Figure 6A:
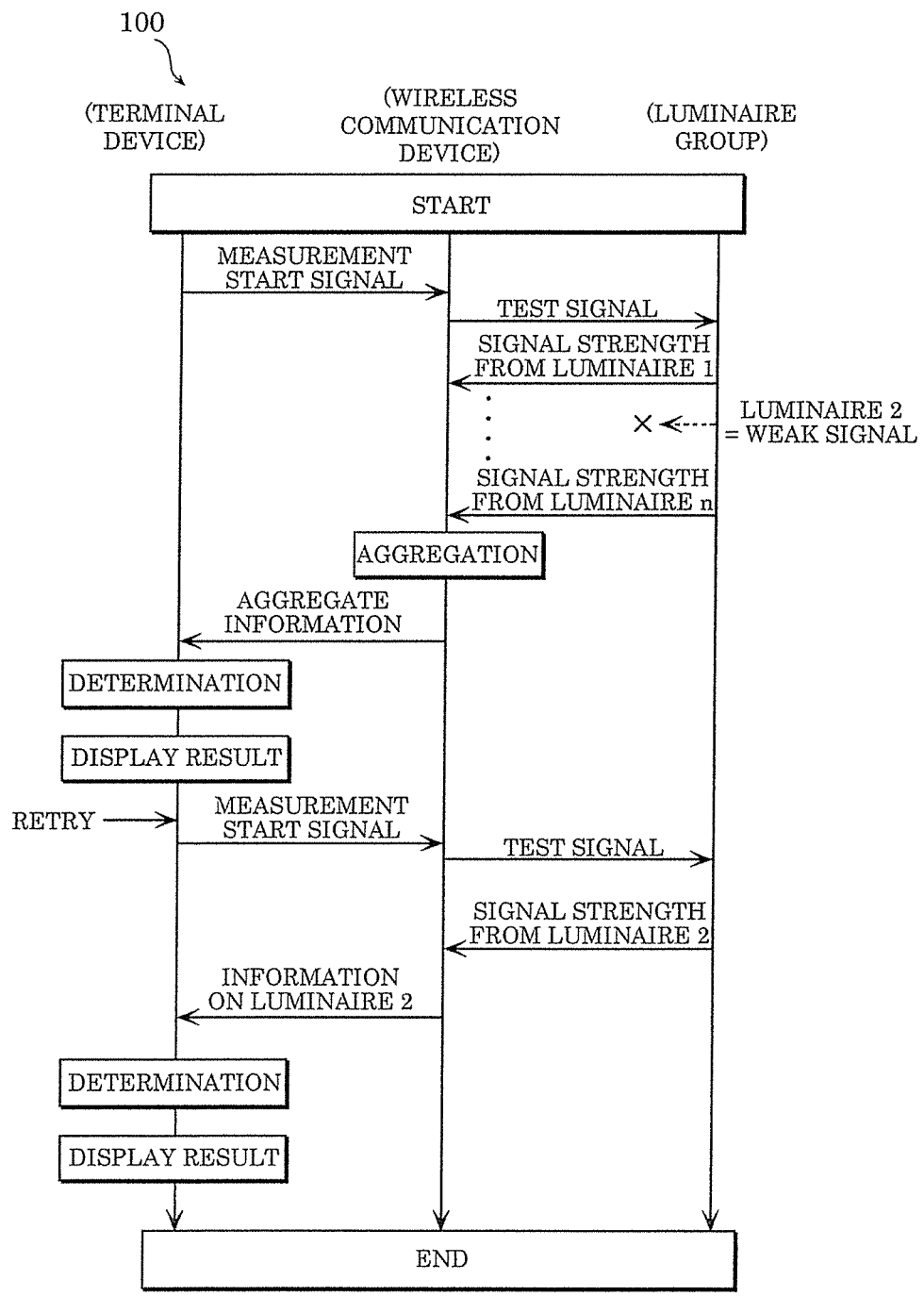
FIG. 6A is a flow chart of the quality determination for a lighting system according to Embodiment 5.
Figure 6B:
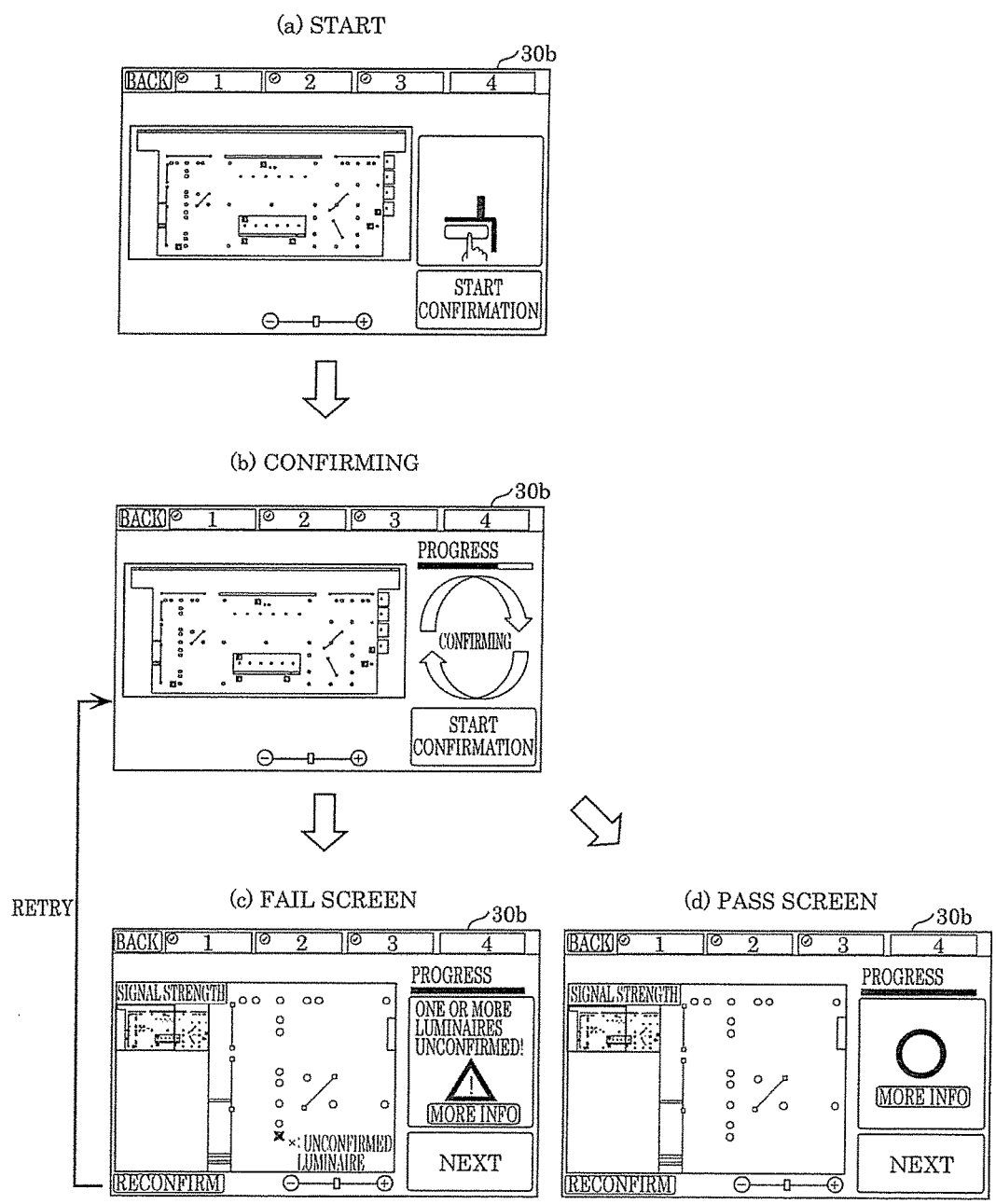
FIG. 6B illustrates a display input unit included in a terminal device in a lighting system according to Embodiment 5.

FIG. 6A is a flow chart of the quality determination for lighting system 100 according to Embodiment 5. FIG. 6B is a diagram of display input unit 30*b* included in terminal device 30 in lighting system 100 according to Embodiment 5.

In Embodiment 5, first, a measurement start signal is transmitted from terminal device 30 to wireless communication device 21. As illustrated in FIG. 6A, upon receipt of the measurement start signal, wireless communication device 21 transmits a test signal to luminaires 1 through n under its control. Having received this test signal, each luminaire 1 through n then transmits signal strength information on the signal strength to wireless communication device 21.

At this stage, the signal strength between wireless communication device 21 and luminaire 2 in lighting system 100 is weak, and the signal strength included in the signal strength information transmitted by luminaire radio 2 is less than or equal to a reference value. Since the signal strength is less than or equal to the reference value, the condition of lighting system 100 is unacceptable, and as illustrated in (c) in FIG. 6B, a "fail" screen is displayed on display input unit 30*b* in terminal device 30. Terminal device 30 stores an identifier related to luminaire 2 determined to belong to the "fail" category.

The measured signal strength values vary to a certain degree depending on the time of day of measurement or due to influence from an external radio wave environment, for example. Accordingly, in Embodiment 5, processes are performed for confirming whether luminaire 2 initially classified into the "fail" category actually belongs in the "fail" category or not by retrying the signal strength measurement.

More specifically, terminal device 30 displays a screen for receiving an input of whether to retransmit the test signal to luminaire 2, whose signal strength was less than or equal to the reference value. Then, when the "reconfirm" icon is pressed in (c) in FIG. 6B and a command for retransmitting the test signal is received, terminal device 30 transmits, to wireless communication device 21, a measurement start signal that designates luminaire 2 as a target for measurement. Upon receipt of the measurement start signal, wireless communication device 21 transmits a test signal to luminaire 2, as illustrated in FIG. 6A. Having received this test signal, luminaire 2 then measures the signal strength and transmits signal strength information on the signal strength to wireless communication device 21. Wireless communication device 21 then transmits the transmitted signal strength information to terminal device 30.

Determining unit 30*d* in terminal device 30 once again performs quality determination for lighting system 100 based on the transmitted signal strength information. For example, if the signal strength for luminaire 2 is greater than or equal to the reference value, determining unit 30*d* determines the condition of the radio wave environment of lighting system 100 to be acceptable, and displays a "pass" screen on display input unit 30*b*, such as the screen illustrated in (d) in FIG. 6B. Note that if the signal strength is less than the reference value, the "fail" screen is once again displayed on display unit 30*b*.

In this embodiment, even if the signal strength varies in lighting system 100, it is possible to increase the degree of certainty of the measurement result of the signal strength. Moreover, since the test signal is only retransmitted to luminaire 2 classified into the "fail" category, compared to when the test signal is retransmitted to all luminaires 1 through n, signal strength information can be obtained more efficiently.

Moreover, in this embodiment, even if the "fail" screen is initially displayed, it is possible to obtain a new determination result once again via a simple operation. Accordingly, this improves the work efficiency of the person who performs operations for determining the quality of lighting system 100.

Embodiment 6

Next, lighting system 100 according to Embodiment 6 will be described. In Embodiment 6, the "retry" process described in Embodiment 5 is performed a plurality of times.

FIG. 7 is a diagram of display input unit 30*b* included in terminal device 30 in lighting system 100 according to Embodiment 6.

With lighting system 100 according to Embodiment 6, the number of times that the retry process described in Embodiment 5 is performed is counted. The number of times that the retry process is performed (hereinafter "retry count") is counted by, for example, control unit 30*c* in terminal device 30. When the retry count exceeds specified number of times X that is determined in advance, the retry process is ended and the screen changes to a user support screen, as illustrated in (d) in FIG. 7. The support screen displays support information for resolving the unacceptable ("fail") condition (trouble shooting or problem resolving examples), or, for example, supplier contact information.

By limiting the retry count as in Embodiment 6, it is possible to limit the number of times the user has to perform the same actions. With this, when the retry process is performed in lighting system 100, it is possible to reduce the amount of time wasted by the user.

Embodiment 7

Next, lighting system 100 according to Embodiment 7 will be described. In Embodiment 7, the signal strengths measured by luminaires 1 through n are displayed visually on display input unit 30b.

FIG. 8 is a diagram of display input unit 30b included in terminal device 30 in lighting system 100 according to Embodiment 7.

In Embodiment 7, after a "fail" or "pass" screen is displayed, an operation can be performed to display the signal strength in order to grasp the reception quality of luminaires 1 through n. More specifically, when the "next" icon is pressed in (c) or (d) in FIG. 8, the signal strengths of luminaires 1 through n are displayed in four stages (strong, good, normal, unconfirmed) via four patterns, as illustrated in (e) or (f) in FIG. 8. Note that the method for indicating signal strength is not limited to the above described patterns; for example, the value of the signal strengths may be displayed.

As with Embodiment 7, by displaying the reception quality of luminaires 1 through n on the screen of terminal device 30, the user can easily grasp the reception quality of lighting system 100.

Embodiment 8

Embodiment 8 relates to cases where the pairing process is stopped. For example, when a partition or new, large equipment is placed in a building, there may be a need to stop the pairing process. In such cases, among luminaires 1 through n, luminaires 1 through k (k is an integer lower than n) are paired with wireless communication device 21, and luminaires k+1 through n, which are different from luminaires 1 through k, are not paired with wireless communication device 21.

Figure 9:
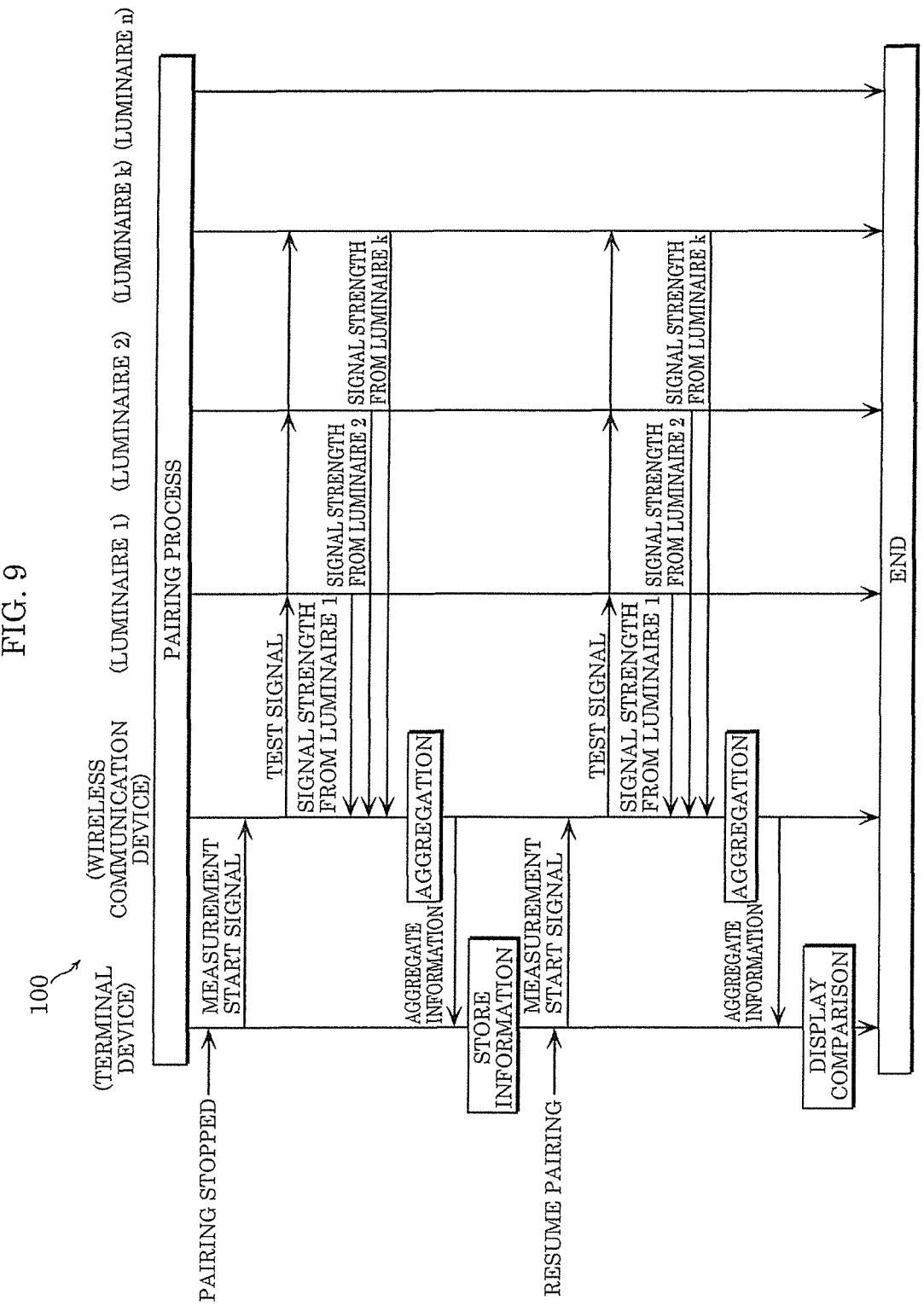
FIG. 9 is a flow chart of the quality determination for a lighting system according to Embodiment 8.

FIG. 9 is a flow chart of the quality determination for lighting system 100 according to Embodiment 8.

In preparation for stopping the pairing process, in lighting system 100, a test signal is transmitted to luminaires 1 through k from wireless communication device 21. Having received this test signal, luminaires 1 through k then measure the signal strength of the test signal and transmit signal strength information on the signal strength to wireless communication device 21. Wireless communication device 21 aggregates this signal strength information and transmits the aggregate information to terminal device 30. Then, in storage unit 30e of terminal device 30, signal strength information on luminaires 1 through k is stored.

Next, the process of resuming the pairing process after the above-described signal strength information is stored will be described. First, the pairing of all luminaires 1 through n with wireless communication device 21 is completed. In this embodiment, the work does not end with the pairing process; additionally, the reception quality is checked as follows. More specifically, the test signal is retransmitted from wireless communication device 21 to at least luminaires 1 through k. Having received this test signal, luminaires 1 through k then remeasure the signal strength of the test signal and transmit signal strength information on the signal strength to wireless communication device 21. Wireless communication device 21 aggregates this signal strength information and transmits the aggregate information to terminal device 30.

Comparing unit 30f of terminal device 30 then compares the signal strength included in the signal strength information stored before the stopping of the pairing process with the signal strength remeasured after resuming the pairing process, and outputs the result. With this, differences in the radio wave environment of lighting system 100 before and after stopping the pairing process can be known. Accordingly, trends in the changes in radio wave environment of lighting system 100 can be known, making it possible to improve the reliability of lighting system 100 when lighting system 100 is handed over to the user.

Embodiment 9

Figure 10A:
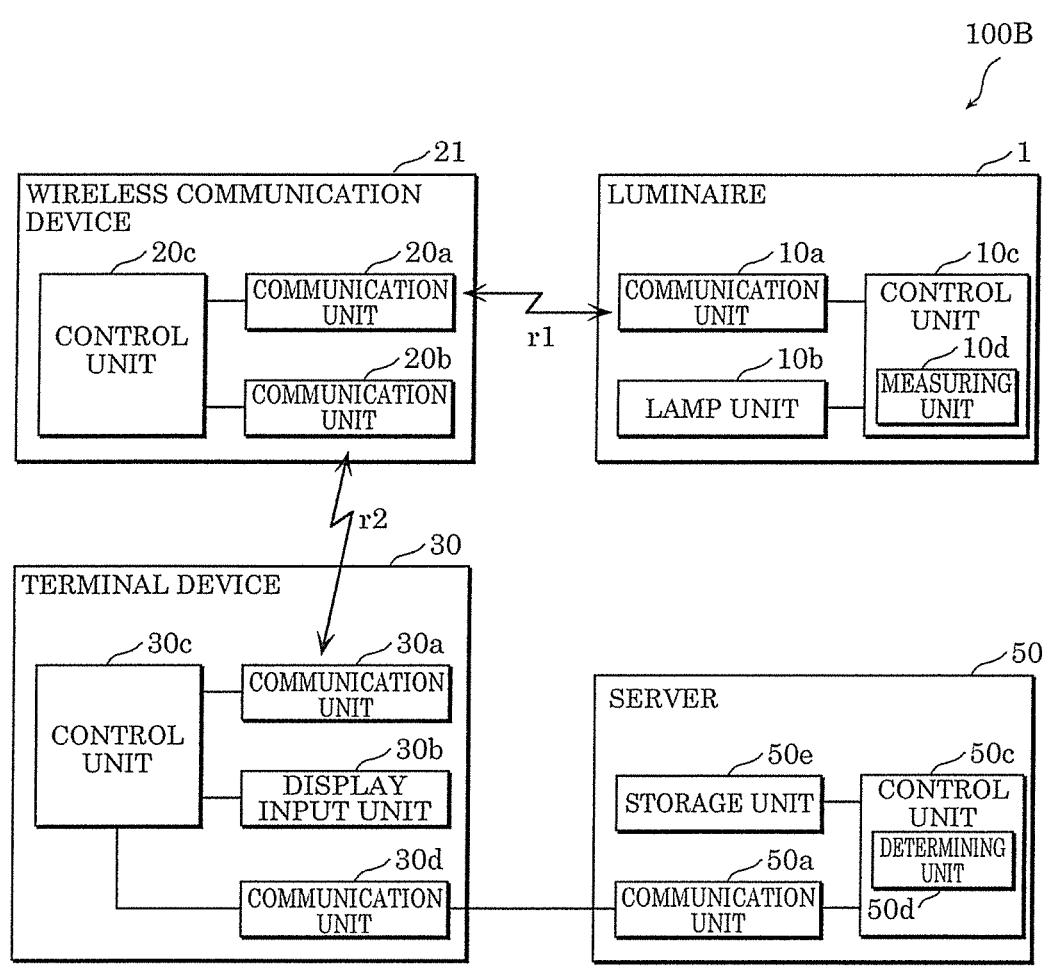
FIG. 10A is a block diagram illustrating the configuration of a lighting system according to Embodiment 9.
Figure 10B:
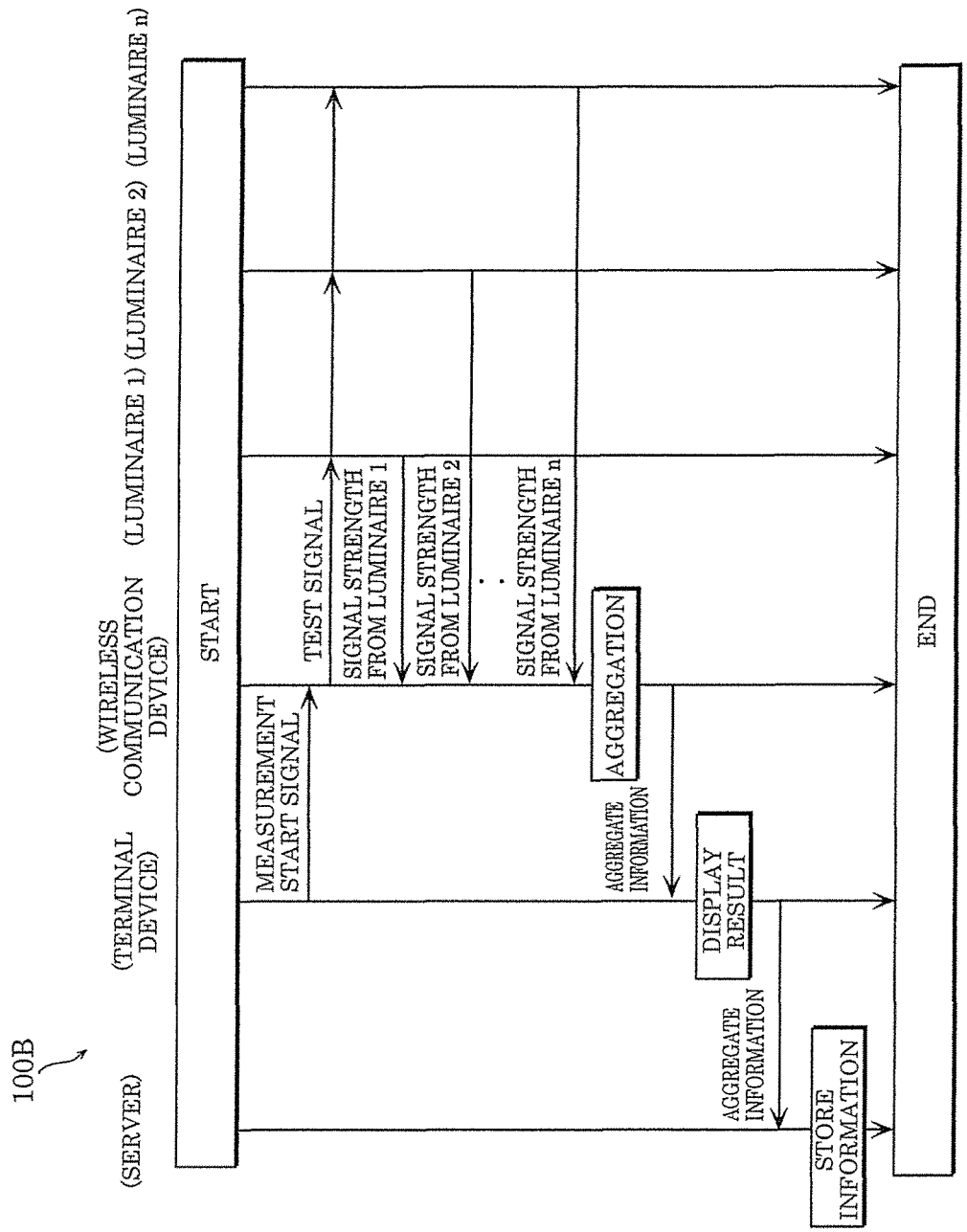
FIG. 10B is a flow chart of the quality determination for a lighting system according to Embodiment 9.

FIG. 10A is a block diagram illustrating the configuration of lighting system 100B according to Embodiment 9. FIG. 10B is a flow chart illustrating the quality determination for lighting system 100B.

Lighting system 100B includes a plurality of luminaires 1 through n, wireless communication device 21, terminal device 30, and server 50. Luminaires 1 through n are each capable of communicating with wireless communication device 21 over radio r1. Terminal device 30 is capable of communicating with wireless communication device 21 over radio r2. Terminal device 30 is capable of communicating with server 50 over a wired connection.

Server 50 is an external centralized management device, and includes: communication unit 50a; storage unit 50e, and control unit 50c connected to communication unit 50a and storage unit 50e. Control unit 50c includes determining unit 50d.

Control unit 50c includes a CPU, and storage unit 50e includes, for example, RAM and ROM. Signal strength information is transmitted to control unit 50c from terminal device 30 via communication unit 50a, and storage unit 50e stores the transmitted signal strength information. In Embodiment 9, for example, daily signal strength information is accumulated in storage unit 50e to generate a database of signal strength information. Moreover, past quality determination results are stored as evidence, and these past quality determination results can be referenced as necessary.

Moreover, in Embodiment 9, determining unit 50d determines whether the condition of the radio wave environment in lighting system 100B is acceptable or not based on the plurality of items of signal strength information transmitted from terminal device 30. For example, determining unit 50d determines the condition of lighting system 100B to be acceptable upon confirming transmission of the signal strength information by all luminaires 1 through n, and determines the condition of lighting system 100B to be unacceptable upon failing to confirm transmission of the signal strength information by at least one of luminaires 1 through n.

In this way, with lighting system 100B according to this embodiment, it is possible to check the radio wave environment of lighting system 100B from outside the system, by using server 50. Moreover, for example, by comparing past quality determination results with current quality determination results, it is possible to grasp trends in changes in the radio wave environment, and therefore possible to improve reliability with relation to the radio wave environment of lighting system 100B.

(Advantageous Effects, Etc.)

Lighting system 100 according to this embodiment includes: wireless communication device 21 that transmits a test signal which is an instruction to measure signal strength; a plurality of luminaires 1 through n, each of which, upon receiving the test signal, measures a signal strength of the test signal and transmits signal strength information on the signal strength to wireless communication device 21; and a determining unit configured to determine a condition of lighting system 100 based on one of the signal strength and the signal strength information. The determining unit is configured to: (i) determine the condition of lighting system 100 to be acceptable upon confirming transmission of the signal strength information by all of the plurality of luminaires 1 through n, and determine the condition of lighting system 100 to be unacceptable upon failing to confirm transmission of the signal strength information by at least one of the plurality of luminaires 1 through n; or (ii) determine the condition of lighting system 100 to be acceptable when each of the signal strengths measured by all of the plurality of luminaires 1 through n exceeds a reference value, and determine the condition of lighting system 100 to be unacceptable when the signal strength measured by at least one of the plurality of luminaires 1 through n is less than or equal to the reference value. In this way, it is possible to check the radio wave environment of lighting system 100 based on transmission or non-transmission of the signal strength information or the magnitude of the signal strength, and thus improve the reliability of lighting system 100.

Lighting system 100 may further include terminal device 30 that includes determining unit 30d. Wireless communication device 21 may transmit, to terminal device 30, the signal strength information transmitted from the plurality of luminaires 1 through n, and determining unit 30d included in terminal device 30 may be configured to determine whether the condition of lighting system 100 is acceptable or not based on the signal strength information transmitted from wireless communication device 21. Inclusion of such a terminal device 30 makes it possible for a user to easily check the radio wave environment of lighting system 100.

Moreover, wireless communication device may include a plurality of wireless communication devices 21, 22, and 23. Lighting system 100 may further include: lighting controller 40 that communicates with the plurality of wireless communication devices 21, 22, and 23; and terminal device 30 that includes determining unit 30d. The plurality of wireless communication devices 21, 22, and 23 may transmit, to lighting controller 40, the signal strength information transmitted from the plurality of luminaires 1 through n. Lighting controller 40 may transmit, to terminal device 30, the signal strength information transmitted from the plurality of wireless communication devices 21 through 23. Determining unit 30d included in terminal device 30 may be configured to determine whether the condition of lighting system 100 is acceptable or not based on the signal strength information transmitted from lighting controller 40. With this, even when lighting system 100A includes a plurality of wireless communication devices 21, 22, and 23, it is possible to improve reliability in relation to the radio wave environment of lighting system 100A.

Moreover, wireless communication device 21 may transmit the test signal to the plurality of luminaires 1 through n upon receiving a measurement start signal originating from terminal device 30. With this, a user of lighting system 100 can easily start the quality determination for lighting system 100 by using terminal device 30.

Moreover, when determining unit 30d determines the condition of lighting system 100 to be unacceptable when the signal strength measured by the at least one of the plurality of luminaires 1 through n (luminaire 2) is less than or equal to the reference value, terminal device 30 may display a screen for receiving an input of whether to retransmit the test signal to the at least one of the plurality of luminaires 1 through n that measured the signal strength of less than or equal to the reference value (i.e., luminaire 2). With this, a user of lighting system 100 can easily retry the measurement of the signal strength by using terminal device 30.

Moreover, when determining unit 30d determines the condition of lighting system 100 to be unacceptable when the signal strength measured by the at least one of the plurality of luminaires 1 through n (for example, luminaire 2) is less than or equal to the reference value, terminal device 30 may transmit the measurement start signal to wireless communication device 21 to prompt retransmission of the test signal to the at least one of the plurality of luminaires 1 through n that measured the signal strength of less than or equal to the reference value (i.e., luminaire 2). In this way, when retrying the measurement of the signal strength, by transmitting the test signal to the at least one luminaire 2 that measured the signal strength of less than or equal to the reference value, it is possible to obtain the signal strength more efficiently than when the test signal is retransmitted to all luminaires 1 through n.

Moreover, terminal device 30 may determine whether the condition of lighting system 100 is acceptable or not a plurality of times and, when the total number of the plurality of times exceeds a specified number of times, may display support information for resolving the unacceptable condition. By limiting the retry count as in this way, it is possible to limit the number of times the user has to perform the same actions, which makes it possible to reduce the amount of time wasted by the user.

Moreover, terminal device 30 may display the signal strengths measured by the plurality of luminaires 1 through n. With this, a user of lighting system 100 can easily know the reception quality of lighting system 100.

Lighting system 100B may further include terminal device 30 and server 50 including determining unit 50d. Terminal device 30 may transmit, to server 50, the signal strength information transmitted from wireless communication device 21, and determining unit 50d included in server 50 may be configured to determine whether the condition of lighting system 100 is acceptable or not based on the signal strength information transmitted from terminal device 30. In this way, it is possible to check the radio wave environment of lighting system 100B from outside the system, by using server 50.

Moreover, each of the plurality of luminaires 1 through n may: determine reception quality to be acceptable when the signal strength exceeds the reference value; determine the reception quality to be unacceptable when the signal strength is less than or equal to the reference value; and indicate a result of the determination via its own lighting state. With this, a user of lighting system 100 can visually grasp the quality of the radio wave environment of lighting system 100.

Moreover, when, during a process of pairing each of the plurality of luminaires 1 through n with wireless communication device 21, one or more of the plurality of luminaires 1 through n (in this example, luminaires 1 through k) may be paired with wireless communication device 21 and the pairing of luminaires k+1 through n not included in the one or more of the plurality of luminaires 1 through k may be stopped, wireless communication device 21 may transmit the test signal to the one or more of the plurality of luminaires 1 through k, and upon receiving the test signal, the one or more of the plurality of luminaires 1 through k may each measure the signal strength of the test signal and transmit the signal strength information to wireless communication device 21. Terminal device 30 may includes storage unit 30e configured to store the signal strength information upon receiving the signal strength information. With this, differences in the radio wave environment of lighting system 100 before and after stopping the pairing process can be known.

Moreover, after the signal strength information is stored, when each of the plurality of luminaires 1 through n is paired with wireless communication device 21, wireless communication device 21 may retransmit the test signal to at least the one or more of the plurality of luminaires 1 through k, and upon receiving the test signal, the one or more of the plurality of luminaires 1 through k may each remeasure the signal strength of the test signal. Terminal device 30 may include comparing unit 30f configured to compare the signal strength included in the signal strength information stored in storage unit 30e with the remeasured signal strength, and outputs a comparison result. With this, differences in the radio wave environment of lighting system 100 before and after stopping the pairing process can be known. By knowing the differences in the radio wave environment, it is possible to improve the reliability of lighting system 100 when lighting system 100 is handed over to the user.

Moreover, after determining unit 30d determines the condition of lighting system 100 to be unacceptable when the signal strength measured by the at least one of the plurality of luminaires 1 through n (for example, luminaire 2) is less than or equal to the reference value, wireless communication device 21 may be configured to communicate with the at least one of the plurality of luminaires 1 through n that measured the signal strength of less than or equal to the reference value (i.e., luminaire 2) by using a transmission power greater than the transmission power used to transmit the test signal. This makes it possible to improve communication quality between wireless communication device 21 and luminaire 2 when wireless communication device 21 has a low signal strength.

Moreover, after determining unit 30d determines the condition of lighting system 100 to be unacceptable when the signal strength measured by the at least one of the plurality of luminaires 1 through n (for example, luminaire 2) is less than or equal to the reference value, wireless communication device 21 may be configured to communicate with the at least one of the plurality of luminaires 1 through n that measured the signal strength of less than or equal to the reference value (i.e., luminaire 2) by using a number of instances of communication greater than the number of instances of communication used to transmit the test signal. This makes it possible to improve communication quality between wireless communication device 21 and luminaire 2 when wireless communication device 21 has a low signal strength.

Moreover, after determining unit 30d determines the condition of lighting system 100 to be unacceptable when the signal strength measured by the at least one of the plurality of luminaires 1 through n (for example, luminaire 2) is less than or equal to the reference value, wireless communication device 21 may be configured to communicate with the at least one of the plurality of luminaires 1 through n that measured the signal strength of less than or equal to the reference value (i.e., luminaire 2) by using a transmission repetition rate lower than the transmission repetition rate used to transmit the test signal. This makes it possible to improve communication quality between wireless communication device 21 and luminaire 2 when wireless communication device 21 has a low signal strength.

A quality determination method for lighting system 100 including a plurality of luminaires 1 through n and wireless communication device 21 that communicates with the plurality of luminaires 1 through n, includes: transmitting a test signal from wireless communication device 21 to the plurality of luminaires 1 through n, the test signal being an instruction to measure signal strength; measuring, by each of the plurality of luminaires 1 through n, a signal strength of the test signal upon receiving the test signal, and transmitting, by each of the plurality of luminaires 1 through n, signal strength information on the signal strength to wireless communication device 21; and (i) determining the condition of lighting system 100 to be acceptable upon confirming transmission of the signal strength information by all of the plurality of luminaires 1 through n, and determining the condition of lighting system 100 to be unacceptable upon failing to confirm transmission of the signal strength information by at least one of the plurality of luminaires 1 through n, or (ii) determining the condition of lighting system 100 to be acceptable when each of the signal strengths measured by all of the plurality of luminaires 1 through n exceeds a reference value, and determining the condition of lighting system 100 to be unacceptable when the signal strength measured by at least one of the plurality of luminaires 1 through n is less than or equal to the reference value. With such a quality determination method, it is possible to check the radio wave environment of lighting system 100 based on transmission or non-transmission of the signal strength information or the magnitude of the signal strength, and thus improve the reliability of lighting system 100.

Moreover, lighting system 100 according to this embodiment may include: a plurality of wireless communication devices 21 through 23 that transmit a test signal which is an instruction to measure signal strength; a plurality of luminaires 1 through n, each of which, upon receiving the test signal, measures a signal strength of the test signal and transmits signal strength information on the signal strength to the plurality of wireless communication devices 21 through 23; lighting controller 40 that communicates with the plurality of wireless communication devices 21 through 23; and terminal device 30 that determines a condition of lighting system 100 based on one of the signal strength and the signal strength information. The plurality of wireless communication devices 21 through 23 may transmit, to lighting controller 40, the signal strength information transmitted from the plurality of luminaires 1 through n, lighting controller 40 may transmit, to terminal device 30, the signal strength information transmitted from the plurality of wireless communication devices 21 through 23, and based on the signal strength information transmitted from lighting controller 40, terminal device 30 may: (i) determine the condition of lighting system 100 to be acceptable upon confirming transmission of the signal strength information by all of the plurality of luminaires 1 through n, and determine the condition of lighting system 100 to be unacceptable upon failing to confirm transmission of the signal strength information by at least one of the plurality of luminaires 1 through n; or (ii) determine the condition of lighting system 100 to be acceptable when each of the signal strengths measured by all of the plurality of luminaires 1 through n exceeds a reference value, and determine the condition of lighting system 100 to be unacceptable when the signal strength measured by at least one of the plurality of luminaires 1 through n is less than or equal to the reference value.

OTHER EMBODIMENTS

Hereinbefore, lighting system 100, 100A, 100B, etc., have been exemplified based on the above embodiments, but the present disclosure is not limited to the above embodiments. Those skilled in the art will readily appreciate that many modifications are possible in the above exemplary embodiment and variations without materially departing from the novel teachings and technical advantages of the present disclosure. Accordingly, all such modifications are intended to be included within the scope of the present disclosure.

In Embodiment 1, terminal device 30 is exemplified as determining the quality of the radio wave environment of lighting system 100, but this example is not limiting. For example, each luminaire 1 through n may include a determining unit that determines the reception quality to be acceptable when the signal strength measured by measuring unit 10d is greater than a reference value and determines the reception quality to be unacceptable when the signal strength is less than or equal to the reference value, and may display the result of the determination via its own lighting state. With this, a user can visually grasp the quality of the radio wave environment.

Moreover, wireless communication device 21 may include a determining unit, may determine the reception quality based on the signal strength information transmitted from luminaires 1 through n, and may turn on a pilot lamp included in the wireless communication device depending on the determination result.

Moreover, in Embodiment 3, the determining of the quality of the radio wave environment of lighting system 100 is not limited to terminal device 30; the determining may be performed by lighting controller 40. In such cases, the determining unit in lighting controller 40 may determine the reception quality based on signal strength information transmitted from wireless communication device 21.

Moreover, in the above embodiments, the radio wave environment is checked, but this example is not limiting; the following may be performed to improve the radio wave environment.

For example, after performing the quality determination for lighting system 100, wireless communication device 21 may be configured to communicate with a luminaire that measured a signal strength of less than or equal to a reference value by using a greater transmission power than used to transmit the test signal. For example, after performing the quality determination for lighting system 100, wireless communication device 21 may be configured to communicate with a luminaire that measured a signal strength of less than or equal to a reference value by using a greater number of instances of communication than used to transmit the test signal. For example, after performing the quality determination for lighting system 100, wireless communication device 21 may be configured to communicate with a luminaire that measured a signal strength of less than or equal to a reference value by using a lower transmission repetition rate lower than used to transmit the test signal. These configurations make it possible to improve communication quality between wireless communication device 21 and a luminaire.

What is claimed is:

1. A lighting system, comprising:
a wireless communication device that transmits a test signal which is an instruction to measure signal strength;
a plurality of luminaires, each of which, upon receiving the test signal, measures a signal strength of the test signal and transmits signal strength information on the signal strength to the wireless communication device; and
a determining unit configured to determine a condition of the lighting system based on one of the signal strength and the signal strength information,
wherein the determining unit is configured to:
(i) determine the condition of the lighting system to be acceptable upon confirming transmission of the signal strength information by all of the plurality of luminaires, and determine the condition of the lighting system to be unacceptable upon failing to confirm transmission of the signal strength information by at least one of the plurality of luminaires; or
(ii) determine the condition of the lighting system to be acceptable when each of the signal strengths measured by all of the plurality of luminaires exceeds a reference value, and determine the condition of the lighting system to be unacceptable when the signal strength measured by at least one of the plurality of luminaires is less than or equal to the reference value.

2. The lighting system according to claim 1, further comprising:
a terminal device that includes the determining unit,
wherein the wireless communication device transmits, to the terminal device, the signal strength information transmitted from the plurality of luminaires, and
the determining unit included in the terminal device is configured to determine whether the condition of the lighting system is acceptable or not based on the signal strength information transmitted from the wireless communication device.

3. The lighting system according to claim 1, wherein
the wireless communication device comprises a plurality of wireless communication devices,
the lighting system further comprises: a lighting controller that communicates with the plurality of wireless communication devices; and a terminal device that includes the determining unit,
the plurality of wireless communication devices transmit, to the lighting controller, the signal strength information transmitted from the plurality of luminaires,
the lighting controller transmits, to the terminal device, the signal strength information transmitted from the plurality of wireless communication devices, and
the determining unit included in the terminal device is configured to determine whether the condition of the lighting system is acceptable or not based on the signal strength information transmitted from the lighting controller.

4. The lighting system according to claim 2, wherein
the wireless communication device transmits the test signal to the plurality of luminaires upon receiving a measurement start signal originating from the terminal device.

5. The lighting system according to claim 2, wherein
when the determining unit determines the condition of the lighting system to be unacceptable when the signal strength measured by the at least one of the plurality of luminaires is less than or equal to the reference value, the terminal device displays a screen for receiving an input of whether to retransmit the test signal to the at least one of the plurality of luminaires that measured the signal strength of less than or equal to the reference value.

6. The lighting system according to claim 4, wherein when the determining unit determines the condition of the lighting system to be unacceptable when the signal strength measured by the at least one of the plurality of luminaires is less than or equal to the reference value, the terminal device transmits the measurement start signal to the wireless communication device to prompt retransmission of the test signal to the at least one of the plurality of luminaires that measured the signal strength of less than or equal to the reference value.

7. The lighting system according to claim 6, wherein the terminal device determines whether the condition of the lighting system is acceptable or not a plurality of times and, when a total number of the plurality of times exceeds a specified number of times, displays support information for resolving the unacceptable condition.

8. The lighting system according to claim 2, wherein the terminal device displays the signal strengths measured by the plurality of luminaires.

9. The lighting system according to claim 1, further comprising:
a terminal device; and
a server including the determining unit,
wherein the terminal device transmits, to the server, the signal strength information transmitted from the wireless communication device, and
the determining unit included in the server is configured to determine whether the condition of the lighting system is acceptable or not based on the signal strength information transmitted from the terminal device.

10. The lighting system according to claim 1, wherein each of the plurality of luminaires: determines reception quality to be acceptable when the signal strength exceeds the reference value; determines the reception quality to be unacceptable when the signal strength is less than or equal to the reference value; and indicates a result of the determination via its own lighting state.

11. The lighting system according to claim 2, wherein when, during a process of pairing each of the plurality of luminaires with the wireless communication device, one or more of the plurality of luminaires are paired with the wireless communication device and the pairing of one of the plurality of luminaires not included in the one or more of the plurality of luminaires is stopped,
the wireless communication device transmits the test signal to the one or more of the plurality of luminaires, and
upon receiving the test signal, the one or more of the plurality of luminaires each measure a signal strength of the test signal and transmit the signal strength information to the wireless communication device, and
the terminal device includes a storage unit configured to store the signal strength information upon receiving the signal strength information.

12. The lighting system according to claim 11, wherein after the signal strength information is stored, when each of the plurality of luminaires is paired with the wireless communication device,
the wireless communication device retransmits the test signal to at least the one or more of the plurality of luminaires, and
upon receiving the test signal, the one or more of the plurality of luminaires each remeasure the signal strength of the test signal, and
the terminal device includes a comparing unit configured to compare the signal strength included in the signal strength information stored in the storage unit with the remeasured signal strength, and outputs a comparison result.

13. The lighting system according to claim 1, wherein after the determining unit determines the condition of the lighting system to be unacceptable when the signal strength measured by the at least one of the plurality of luminaires is less than or equal to the reference value, the wireless communication device is configured to communicate with the at least one of the plurality of luminaires that measured the signal strength of less than or equal to the reference value by using a transmission power greater than a transmission power used to transmit the test signal.

14. The lighting system according to claim 1, wherein after the determining unit determines the condition of the lighting system to be unacceptable when the signal strength measured by the at least one of the plurality of luminaires is less than or equal to the reference value, the wireless communication device is configured to communicate with the at least one of the plurality of luminaires that measured the signal strength of less than or equal to the reference value by using a number of instances of communication greater than a number of instances of communication used to transmit the test signal.

15. The lighting system according to claim 1, wherein after the determining unit determines the condition of the lighting system to be unacceptable when the signal strength measured by the at least one of the plurality of luminaires is less than or equal to the reference value, the wireless communication device is configured to communicate with the at least one of the plurality of luminaires that measured the signal strength of less than or equal to the reference value by using a transmission repetition rate lower than a transmission repetition rate used to transmit the test signal.

16. A lighting system, comprising:
a plurality of wireless communication devices that transmit a test signal which is an instruction to measure signal strength;
a plurality of luminaires, each of which, upon receiving the test signal, measures a signal strength of the test signal and transmits signal strength information on the signal strength to the plurality of wireless communication devices;
a lighting controller that communicates with the plurality of wireless communication devices; and
a terminal device that determines a condition of the lighting system based on one of the signal strength and the signal strength information,
wherein the plurality of wireless communication devices transmit, to the lighting controller, the signal strength information transmitted from the plurality of luminaires,
the lighting controller transmits, to the terminal device, the signal strength information transmitted from the plurality of wireless communication devices, and based on the signal strength information transmitted from the lighting controller, the terminal device:

(i) determines the condition of the lighting system to be acceptable upon confirming transmission of the signal strength information by all of the plurality of luminaires, and determines the condition of the lighting system to be unacceptable upon failing to confirm transmission of the signal strength information by at least one of the plurality of luminaires; or (ii) determines the condition of the lighting system to be acceptable when each of the signal strengths measured by all of the plurality of luminaires exceeds a reference value, and determines the condition of the lighting system to be unacceptable when the signal strength measured by at least one of the plurality of luminaires is less than or equal to the reference value.

17. A quality determination method for a lighting system including a plurality of luminaires and a wireless communication device that communicates with the plurality of luminaires, the quality determination method comprising:

transmitting a test signal from the wireless communication device to the plurality of luminaires, the test signal being an instruction to measure signal strength;

measuring, by each of the plurality of luminaires, a signal strength of the test signal upon receiving the test signal, and transmitting, by each of the plurality of luminaires, signal strength information on the signal strength to the wireless communication device; and (i) determining the condition of the lighting system to be acceptable upon confirming transmission of the signal strength information by all of the plurality of luminaires, and determining the condition of the lighting system to be unacceptable upon failing to confirm transmission of the signal strength information by at least one of the plurality of luminaires, or (ii) determining the condition of the lighting system to be acceptable when each of the signal strengths measured by all of the plurality of luminaires exceeds a reference value, and determining the condition of the lighting system to be unacceptable when the signal strength measured by at least one of the plurality of luminaires is less than or equal to the reference value.

* * * * *